(12) United States Patent
Amick et al.

(10) Patent No.: US 11,800,867 B2
(45) Date of Patent: *Oct. 31, 2023

(54) METHODS OF REPELLING BITING ARTHROPODS, REDUCING PATHOGEN SPREAD AND TREATING ARTHROPOD INFESTATION

(71) Applicant: EVOLVA SA, Reinach (CH)

(72) Inventors: Jean Davin Amick, Lexington, KY (US); Bryan N. Julien, Lexington, KY (US); Kim Thu Le Greenbaum, San Diego, CA (US)

(73) Assignee: EVOLVA SA, Reinach (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/525,074

(22) Filed: Nov. 12, 2021

(65) Prior Publication Data
US 2022/0132841 A1 May 5, 2022

Related U.S. Application Data

(63) Continuation of application No. 16/086,471, filed as application No. PCT/EP2017/057133 on Mar. 24, 2017, now Pat. No. 11,191,266.

(60) Provisional application No. 62/313,001, filed on Mar. 24, 2016.

(51) Int. Cl.
*A01N 35/06* (2006.01)
(52) U.S. Cl.
CPC .................................. *A01N 35/06* (2013.01)
(58) Field of Classification Search
None
See application file for complete search history.

(56) References Cited

U.S. PATENT DOCUMENTS

| | | |
|---|---|---|
| 4,800,196 A | 1/1989 | Nomura et al. |
| 5,317,041 A | 5/1994 | Chapman et al. |
| 5,847,226 A | 12/1998 | Muller et al. |
| 5,916,917 A | 6/1999 | Suh et al. |
| 6,107,341 A | 8/2000 | Hansen et al. |
| 6,124,275 A | 9/2000 | Emerson |
| 6,531,303 B1 | 3/2003 | Millis et al. |

(Continued)

FOREIGN PATENT DOCUMENTS

| | | |
|---|---|---|
| EP | 1033076 A1 | 9/2000 |
| EP | 1083233 | 3/2001 |

(Continued)

OTHER PUBLICATIONS

Audrain et al.: "Allergy to oxidized limonene and linalool is frequent in the U.K.", British Journal of Dermatology, vol. 171, No. 2 (2014).

(Continued)

*Primary Examiner* — Dominic Lazaro
(74) *Attorney, Agent, or Firm* — Hoxie & Associates LLC

(57) ABSTRACT

The invention relates to biting arthropod repellent compositions comprising nootkatone. The application also relates to a method of repelling said biting arthropods by application of the nootkatone composition to a hard or soft surface, to a method of treating an arthropod infestation and to a method of reducing the transmission of a parasite or disease pathogen spread by a biting arthropod using the nootkatone composition.

23 Claims, 7 Drawing Sheets
Specification includes a Sequence Listing.

(56) References Cited

U.S. PATENT DOCUMENTS

| | | | |
|---|---|---|---|
| 6,685,948 B1 | 2/2004 | Zeng et al. | |
| 6,689,593 B2 | 2/2004 | Millis et al. | |
| 6,808,717 B1 | 10/2004 | Bale | |
| 7,129,271 B2 | 10/2006 | Maupin | |
| 7,442,785 B2 | 10/2008 | Chappell et al. | |
| 8,551,510 B2 | 10/2013 | Bedoukian | |
| 11,191,266 B2 * | 12/2021 | Amick | A01N 35/06 |
| 2004/0249219 A1 | 12/2004 | Saucy et al. | |
| 2005/0176818 A1 | 8/2005 | Maupin et al. | |
| 2005/0187289 A1 | 8/2005 | Dolan et al. | |
| 2007/0192986 A1 | 8/2007 | Garcia et al. | |
| 2010/0151519 A1 | 6/2010 | Julien et al. | |
| 2012/0246767 A1 | 9/2012 | Amick et al. | |
| 2015/0007368 A1 | 1/2015 | Saran et al. | |
| 2015/0250166 A1 | 9/2015 | Goldblum et al. | |
| 2019/0098897 A1 | 4/2019 | Amick et al. | |

FOREIGN PATENT DOCUMENTS

| | | | |
|---|---|---|---|
| EP | 2 537 926 | 12/2012 | |
| JP | H10-87409 | 4/1998 | |
| WO | 01/28343 A1 | 4/2001 | |
| WO | 02/50053 A2 | 6/2002 | |
| WO | 2010/126576 A1 | 11/2010 | |
| WO | 2014/031790 A1 | 2/2014 | |
| WO | WO-2014031790 A1 * | 2/2014 | A01N 35/06 |

OTHER PUBLICATIONS

"Flavor & Fragrance Compendium," Bedoukian Research, 169 pages https://search.bedoukian.com/flavorfragrance/downloads/catalog_ff.pdf.

Karlberg et al.: "Contact allergy to oxidized D-limonene among dermatitis patients", Contact Dermatitis, p. 201-206 (1997).

Kejlova et al.: "Phototoxicity of bergamot oil assessed by in vitro techniques in combination with human patch tests", Toxicology in vitro, vol. 21, No. 7, p. 1298-1303 (2007).

Letizia, C. S. et al., "Nootkatone," Food and Chemical Toxicology, vol. 38, Supplement 3, 2000, pp. s165-s167.

National Center for Biotechnology Information. PubChem Database. Limonene, CID=22311, https://pubchem.ncbi.nlm.nih.gov/compound/Limonene (accessed on Apr. 28, 2020).

"Orange oil" Wikipedia, Wikimedia Foundation, Nov. 29, 2019, https://en.wikipedia.org/w/index.php?title=Orange_oil&oldid=928474807.

"Safety Data Sheet—Nootkatone", May 20, 2015, p. 1-6.

International Search Report and Written Opinion for Int. App. No. PCT/EP2017/057133, dated Jun. 14, 2017.

Behle, Robert W., et al., "A Formulation to Encapsulate Nootkatone for Tick Control," Journal of Medical Entomology, 2011, vol. 48, Nr:6, pp. 1120-1127.

"Safety Assessment of Citrus Derived Peel Oils as Used in Cosmetics," Cosmetic Ingredient Review Expert Panel Final Report, Sep. 30, 2014: 1-31.

Bomgardner, "Nootkalone tested as a mosquito repellent" C&EN Global Enterprise (ACS Publication) (2016) vol. 94(14), p. 10.

Chang, J. H. et al., "Effect of Application of Benzyl Benzoate on House Dust Mile Allergen Levels," Annals of Allergy, Asthma & Immunology, 1996, vol. 77, Nr:3, pp. 187-190.

Chen, Xu Bo et al. "Essential Oil Composition and Larvicidal Activity of Clinopodium gracile (Benth) Matsum Labiatae) Aerial Parts against the *Aedes albopictus* Mosquito" Tropical Journal of Pharmaceutical Research (2013) vol. 12(5), pp. 799-804.

Dancewicz, K., et al., "Deterrent activity of (+)-nootkatone and its derivatives towards the peach potato aphid (*Myzus persicae Sulzer*)," Progress in plant protection, 2012, vol. 52, Nr:5, pp. 221-225.

Dolan, Marc C., et al., "Ability of Two Natural Products, Nootkatone and Carvacrol, to Suppress Ixodes scapularis and Amblyomma americanum (Acari: Ixodidae) in a Lyme Disease Endemic Area of New Jersey," Journal of Economic Entomology, 2009, vol. 102, Nr:6, pp. 2316-2324.

Fishel, F., Using Your Handhed Lawn and Garden Sprayer, 2009, University of Florida Institute of Food and Agricultural Sciences, pp. 1-4 (2009).

Flor-Weiler, Lina B., et al., "Susceptibility of Four Tick Species, *Amblyomma americanum*, *Dermacentor variabilis*, *Ixodes scapularis*, and *Rhipicephalus sanguineus* (Acari: Ixodidae), to Nootkatone From Essential Oil of Grapefruit," Journal of Medical Entomology, 2011, vol. 48, Nr:2, pp. 322-326.

Gionfriddo et al. "Elimination of Furocoumarins in Bergamot Peel Oil," Perfumer & Flavorist, 29:48-52 (2004).

Hamdan et al. "Anti-inflammatory, insecticidal and antimicrobial activities and chemical composition of the essential oils of different plant organs from navel orange (*Citrus sinensis* (L.) Osbeck var. *malesy*) grown in Egypt" Journal of Medicinal Plants Research (2013) vol. 7(18), pp. 1204-1215.

Kardarohman, et al. "Biolarvicidal of Veliver Oil and Ethanol Extract of Veliver Root Distillation Waste Veliveria zizanoides) Effectiveness toward Aedes aegypti, *Culex* sp., and Anopheles sundaicus" Journal of Essential Oil-Bearing Plants (2013) vol. 16(6), pp. 749-762.

Maia et al. "Plant-based insect repellents: a review of their efficacy, development and testing," Malaria Journal 10: Suppl1-11 (2011).

Mao, L., et al. "Vetiver oil and nootkatone effects on the growth of pea and citrus," Industrial Crops and Products,2006, vol. 23, Nr:3, pp. 327-332.

Mcallister et al., "Mode of Action for Natural Products Isolated From Essential Oils of Two Trees Is Different From Available Mosquito Adulticides" Journal of Medical Entomology (2010) vol. 47(6), pp. 1123-1126.

Nootkatone Sigma-Aldrich Product No. 74437 at https://www.sigmaaldrich.com/catalog/product/aldrich/74437?lang=en&region=US&cm_sp=Insite-_-caContent_prodMerch_gruCrossEntropy-_-prod Merch 10-1) (Retrieved from the internet Jan. 1, 2021) (2021).

Takahashi et al., "Metabolic engineering of sesquiterpene metabolism in yeast," Biotechnol Bioeng. 97(1):170-81 (2007).

International Search Report and Written Opinion for Int. App. No. PCT/EP2017/057138, dated Jun. 13, 2017.

International Search Report and Written Opinion for Int. App. No. PCT/EP2017/057137, dated Jun. 14, 2017.

International Search Report (ISR) for PCT/EP2017/072027 dated Dec. 12, 2017, pp. 1-5.

Written Opinion of the International Searching Authority for PCT/EP2017/072027 dated Dec. 12, 2017, pp. 1-7.

Hartley et al., "DNA cloning using in vitro site-specific recombination," Genome Res. Nov. 2000;10(11):1788-95.

Limonene CASRN: 138-86-3; Toxnet Toxicology Data Network.

International Preliminary Report on Patentability for International Application No. PCT/EP2017/057124, dated Sep. 25, 2018.

International Search Report and Written Opinion for Int. App. No. PCT/EP2017/057124, dated Jun. 27, 2017.

\* cited by examiner

SEQUENCE LISTING

<160> NUMBER OF SEQ ID NOS: 2

<210> SEQ ID NO 1
<211> LENGTH: 1647
<212> TYPE: DNA
<213> ORGANISM: Citrus sinensis

<400> SEQUENCE: 1

```
atgtcgtctg gagaaacatt tcgtcctact gcagatttcc atcctagttt atggagaaac      60
catttcctca aaggtgcttc tgatttcaag acagttgatc atactgcaac tcaagaacga     120
cacgaggcac tgaaagaaga ggtaaggaga atgataacag atgctgaaga taagcctgtt     180
cagaagttac gcttgattga tgaagtacaa cgcctggggg tggcttatca ctttgagaaa     240
gaaatagaag atgcaataca aaaattatgt ccaatctata ttgacagtaa tagagctgat     300
ctccacaccg tttcccttca ttttcgattg cttaggcagc aaggaatcaa gatttcatgt     360
gatgtgtttg agaagttcaa agatgatgag ggtagattca agtcatcgtt gataaacgat     420
gttcaaggga tgttaagttt gtacgaggca gcatacatgg cagttcgcgg agaacatata     480
ttagatgaag ccattgcttt cactaccact cacctgaagt cattggtagc tcaggatcat     540
gtaacccccta agcttgcgga acagataaat catgctttat accgtcctct tcgtaaaacc     600
ctaccaagat tagaggcgag gtattttatg tccatgatca attcaacaag tgatcattta     660
tacaataaaa ctctgctgaa ttttgcaaag ttagatttta acatattgct agagctgcac     720
aaggaggaac tcaatgaatt aacaaagtgg tggaaagatt tagacttcac tacaaaacta     780
ccttatgcaa gagacagatt agtggagtta tattttggg atttagggac atacttcgag     840
cctcaatatg catttgggag aaagataatg acccaattaa attacatatt atccatcata     900
gatgatactt atgatgcgta tggtacactt gaagaactca gcctctttac tgaagcagtt     960
caaagatgga atattgaggc cgtagatatg cttccagaat acatgaaatt gatttacagg    1020
acactcttag atgcttttaa tgaaattgag gaagatatgg ccaagcaagg aagatcacac    1080
tgcgtacgtt atgcaaaaga ggagaatcaa aaagtaattg gagcatactc tgttcaagcc    1140
aaatggttca gtgaaggtta cgttccaaca attgaggagt atatgcctat tgcactaaca    1200
agttgtgctt acacattcgt cataacaaat tccttccttg gcatgggtga ttttgcaact    1260
aaagaggttt tgaatggat ctccaataac cctaaggtta taaaagcagc atcagttatc    1320
tgcagactca tggatgacat gcaaggtcat gagtttgagc agaagagagg acatgttgcg    1380
tcagctattg aatgttacac gaagcagcat ggtgtctcta aggaagaggc aattaaaatg    1440
tttgaagaag aagttgcaaa tgcatggaaa gatattaacg aggagttgat gatgaagcca    1500
accgtcgttg cccgaccact gctcgggacg attcttaatc ttgctcgtgc aattgatttt    1560
atttacaaag aggacgacgg ctatacgcat tcttacctaa ttaaagatca aattgcttct    1620
gtgctaggag accacgttcc attttga                                       1647
```

<210> SEQ ID NO 2
<211> LENGTH: 548
<212> TYPE: PRT
<213> ORGANISM: Citrus sinensis

```
<400> SEQUENCE: 2

Met Ser Ser Gly Glu Thr Phe Arg Pro Thr Ala Asp Phe His Pro Ser
1               5                   10                  15

Leu Trp Arg Asn His Phe Leu Lys Gly Ala Ser Asp Phe Lys Thr Val
            20                  25                  30

Asp His Thr Ala Thr Gln Glu Arg His Glu Ala Leu Lys Glu Glu Val
        35                  40                  45

Arg Arg Met Ile Thr Asp Ala Glu Asp Lys Pro Val Gln Lys Leu Arg
    50                  55                  60

Leu Ile Asp Glu Val Gln Arg Leu Gly Val Ala Tyr His Phe Glu Lys
65                  70                  75                  80

Glu Ile Glu Asp Ala Ile Gln Lys Leu Cys Pro Ile Tyr Ile Asp Ser
                85                  90                  95

Asn Arg Ala Asp Leu His Thr Val Ser Leu His Phe Arg Leu Leu Arg
            100                 105                 110

Gln Gln Gly Ile Lys Ile Ser Cys Asp Val Phe Glu Lys Phe Lys Asp
        115                 120                 125

Asp Glu Gly Arg Phe Lys Ser Ser Leu Ile Asn Asp Val Gln Gly Met
    130                 135                 140

Leu Ser Leu Tyr Glu Ala Ala Tyr Met Ala Val Arg Gly Glu His Ile
145                 150                 155                 160

Leu Asp Glu Ala Ile Ala Phe Thr Thr Thr His Leu Lys Ser Leu Val
                165                 170                 175

Ala Gln Asp His Val Thr Pro Lys Leu Ala Glu Gln Ile Asn His Ala
            180                 185                 190

Leu Tyr Arg Pro Leu Arg Lys Thr Leu Pro Arg Leu Glu Ala Arg Tyr
        195                 200                 205

Phe Met Ser Met Ile Asn Ser Thr Ser Asp His Leu Tyr Asn Lys Thr
    210                 215                 220

Leu Leu Asn Phe Ala Lys Leu Asp Phe Asn Ile Leu Leu Glu Leu His
225                 230                 235                 240

Lys Glu Glu Leu Asn Glu Leu Thr Lys Trp Trp Lys Asp Leu Asp Phe
                245                 250                 255

Thr Thr Lys Leu Pro Tyr Ala Arg Asp Arg Leu Val Glu Leu Tyr Phe
            260                 265                 270

Trp Asp Leu Gly Thr Tyr Phe Glu Pro Gln Tyr Ala Phe Gly Arg Lys
        275                 280                 285

Ile Met Thr Gln Leu Asn Tyr Ile Leu Ser Ile Asp Asp Thr Tyr
    290                 295                 300

Asp Ala Tyr Gly Thr Leu Glu Glu Leu Ser Leu Phe Thr Glu Ala Val
305                 310                 315                 320

Gln Arg Trp Asn Ile Glu Ala Val Asp Met Leu Pro Glu Tyr Met Lys
                325                 330                 335

Leu Ile Tyr Arg Thr Leu Leu Asp Ala Phe Asn Glu Ile Glu Glu Asp
            340                 345                 350

Met Ala Lys Gln Gly Arg Ser His Cys Val Arg Tyr Ala Lys Glu Glu
        355                 360                 365

Asn Gln Lys Val Ile Gly Ala Tyr Ser Val Gln Ala Lys Trp Phe Ser
    370                 375                 380

Glu Gly Tyr Val Pro Thr Ile Glu Glu Tyr Met Pro Ile Ala Leu Thr
385                 390                 395                 400

Ser Cys Ala Tyr Thr Phe Val Ile Thr Asn Ser Phe Leu Gly Met Gly
                405                 410                 415
```

```
Asp Phe Ala Thr Lys Glu Val Phe Glu Trp Ile Ser Asn Asn Pro Lys
            420                 425                 430

Val Val Lys Ala Ala Ser Val Ile Cys Arg Leu Met Asp Asp Met Gln
            435                 440                 445

Gly His Glu Phe Glu Gln Lys Arg Gly His Val Ala Ser Ala Ile Glu
    450                 455                 460

Cys Tyr Thr Lys Gln His Gly Val Ser Lys Glu Glu Ala Ile Lys Met
465                 470                 475                 480

Phe Glu Glu Glu Val Ala Asn Ala Trp Lys Asp Ile Asn Glu Glu Leu
                485                 490                 495

Met Met Lys Pro Thr Val Val Ala Arg Pro Leu Leu Gly Thr Ile Leu
            500                 505                 510

Asn Leu Ala Arg Ala Ile Asp Phe Ile Tyr Lys Glu Asp Asp Gly Tyr
            515                 520                 525

Thr His Ser Tyr Leu Ile Lys Asp Gln Ile Ala Ser Val Leu Gly Asp
    530                 535                 540

His Val Pro Phe
545
```

METHODS OF REPELLING BITING ARTHROPODS, REDUCING PATHOGEN SPREAD AND TREATING ARTHROPOD INFESTATION

CROSS-REFERENCE TO RELATED APPLICATIONS

The present application is a continuation of U.S. patent application Ser. No. 16/086,471, filed Sep. 19, 2018, which is a U.S. National Phase Application pursuant to 35 U.S.C. § 371 of International Application No. PCT/EP2017/057133, filed Mar. 24, 2017, which claims priority to U.S. Provisional Patent Application No. 62/313,001, filed Mar. 24, 2016. The entirety of the disclosure of each of these applications is hereby incorporated by reference into the present application.

BACKGROUND OF THE INVENTION

Field of the Invention

This disclosure relates to the prevention of infections mediated by arthropods and arthropod infestations.

Description of Related Art

*Aedes* species mosquitoes, including *Culex modestus, Ae. aegypti*, and *Ae. albopictus*, are known vectors for multiple human diseases, including those caused by *Plasmodium* (malaria), dengue, Flaviviridae (West Nile fever), alphaviruses including Togaviridae (chikungunya), and Zika viruses (i.e., arthropod-borne viruses or "arboviruses"). These diseases are prevalent in tropical climates; however, there are increasing numbers of reports of transmission into more temperate climates, including the continental United States, as *Aedes* species mosquitoes carrying these viruses spread.

While the introduction of virus-carrying mosquitoes into areas without these diseases is a primary concern, non-virus carrying mosquitoes can become virus carriers by feeding on infected humans. Thus, as the prevalence of viral infections in humans increases, the chances of a non-virus carrying mosquito feeding on an infected person and becoming a virus carrier also increases. Therefore, while the prevention of mosquito bites among non-infected humans is important, it is equally important to prevent "re-biting" of infected individuals to halt the spread of these diseases.

Moreover, other biting arthropods, such as ticks, fleas, sandflies and the like, are known carriers of numerous diseases (disease pathogens) and parasites, and for many of those disease pathogens, effective vaccines are still not available.

Arthropods are also capable of acting as vectors for parasites. For example, the large female botfly transiently captures flying mosquitoes and lays approximately 30 eggs under the wings. The botfly larvae or eggs drop off the mosquito when they detect the proximity of a suitable host, which they enter either via the mosquito bite or by burrowing. The larvae of the human botfly (*Dermatobia hominis*) develop for eight weeks in subcutaneous layers before emerging. *Dermatobia* eggs have been shown to be vectored by over 40 species of arthropod, including mosquitoes, flies, and ticks.

Biting arthropods often fulfill a crucial role in the transmission of the disease pathogen or parasite by rapid transportation, difficult detection, and evading the first significant barrier of the host, the skin. Arthropods biting as a defensive mechanism (such as societal insects) or to obtain a blood meal may be better adapted to detect certain host species, but once a potential threat or host is detected the biting arthropods often do not restrict their biting or feeding behavior to a specific species. Hence, biting arthropods also transmit disease pathogens and parasites across species barriers. This is particularly problematic when a host, such as a domestic, farm, or companion animal, is able to act as an asymptomatic reservoir for the vectored infection or infestation of humans. Non-limiting examples include transmission of Leishmaniasis from dogs by sand flies, transmission of *Yersinia pestis* bacterium from black rats by Oriental rat fleas, and transmission of Lyme Borreliosis and tick-borne encephalitis from deer by ticks, fleas and lice.

Many other arthropod pests are problematic for humans and domestic animals, including dust mites, termites, aphids, ants, fleas, and bed bugs. These arthropod pests inhabit myriad niches within houses and other buildings and surrounding environments. In particular, arthropods capable of biting humans, either as a food source or as a defense mechanism in response to a perceived threat, may variously be bothersome, painful, a potential source of infection, induce an inflammatory immune response, or act as vectors to transmit infectious diseases or parasites. For this reason, methods to combat such arthropod pest infestations tend to be as diverse as the infestations themselves.

Current arthropod repellent and pesticide compositions are effective at preventing mosquito bites, but they have limitations. For example, DEET (N,N-Diethyl-meta-toluamide) is effective for repelling mosquitoes, but DEET is perceived by many to have a strong "chemical" smell at concentrations commonly used, and this perception cannot be remedied by lowering the DEET concentration because of decreased efficacy at lower concentrations. In addition, DEET is a known plasticizer that can damage clothing, such as watchbands at higher concentrations. Further, people also dislike the oily feel of DEET preparations. In addition to DEET, other compositions used to repel or kill insects and pests include synthetic pyrethroids such as permethrin, carbamates, and chlorinated hydrocarbons, such as lindane. Yet, like DEET, such synthetic pesticides and repellents also suffer from the stigma that they are not safe.

Similarly, treatments to combat arthropod pest infestations have some efficacy, but also have limitations either in actual results or due to perceived dangers. Dust mites can be treated with conventional, synthetic miticides, but such treatments are counterindicated due to the likelihood of human exposure. Termites can be treated with numerous different synthetic chemicals that can be applied to soil or via "tenting." Yet, such treatments are believed to put humans and wildlife at risk of poisoning. Indeed, treatment regimens for combatting all arthropod pests are often deemed to be dangerous and therefore compliance with treatment regimens can be poor.

Therefore, there is a need for new arthropod repellent compositions with broad arthropod specificity that can effectively combat mosquito-borne and other arthropod-borne viral or parasitic infections, on the one hand, and also treat and prevent arthropod infestations, generally, while avoiding the stigma associated with synthetic insect repellent compositions.

SUMMARY OF THE INVENTION

It is against the above background that the present invention provides certain advantages and advancements over the prior art. In particular, as set forth herein, the use of natural insect repellent compositions is disclosed herein.

Although this invention disclosed herein is not limited to specific advantages or functionalities, in a first aspect, the invention provides a method for repelling or killing *Aedes aegypti* mosquitos or other arthropods carrying a pathogen or parasite, comprising applying a formulation comprising nootkatone to a surface or a material in an amount sufficient to repel or kill said mosquito. In one embodiment, the pathogen is an arbovirus, and the arbovirus causes or is associated with dengue fever, chikungunya, yellow fever, or Zika virus infection. In one embodiment, the parasite is a botfly. In one embodiment, the surface is animal skin, hair or fur. In one embodiment, the animal is a human. In another embodiment, the surface includes a hard surface, and the hard surface includes untreated lumber, treated lumber, a wood beam, a wood board, cardboard, particle board, a joist, a stud, a baseboard, wood trim, a hardwood floor, a window sill, a screen, a porch floor, a deck, a door, a wall, a ceiling, interior furniture, exterior furniture. In a further embodiment, the surface includes a soft surface, and the soft surface includes a carpet, a curtain, a rug, padded furniture, a cushion, a mattress, a box spring, a mattress cover, a bedbug repellent mattress pad, a bed sheet, a blanket, a pillow, a doll, a stuffed animal, a net. In one embodiment, the material includes bedding, clothing, netting, window screens, door screens, or a reservoir of an active insect repellent dispenser.

In a second aspect, the invention provides a formulation for repelling or killing *Aedes aegypti* mosquitoes or other arthropods carrying a pathogen, comprising nootkatone at a concentration of at least 1% and at least one acceptable carrier, emollient, diluent or adjuvant. In one embodiment, the formulation is an aerosol, a solution, an emulsion, an oil, a lotion, a cream, a soap, a shampoo, a conditioner, a spray, a gel, a cosmetic, a sunscreen, a perfume, or a cologne. In another embodiment, the formulation is edible by a human or an animal. In a further embodiment, the formulation is an animal feed, and the animal feed includes extruded animal food, a grain, a canned food, an animal treat, or a dog bone. In another embodiment, the formulation is a powder, a capsule, a tablet, a chewable tablet, a pellet, a pill, a lozenge, a food item, a chewing gum, a syrup, or an elixir.

In a third aspect, the invention provides a method of repelling a biting arthropod includes applying an effective amount of a nootkatone composition to a surface. The composition includes nootkatone ex valencene. In one embodiment of the third aspect, the biting arthropod includes one or more of a cat flea, a bed bug, a termite, a fire ant, a centipede, a chigger, a drain fly, a biting fly, a black fly, a deer fly, a sand fly, a horse fly, a stable fly, a kissing bug, an earwig, a biting gnat, a louse, a millipede, a mite, or a mosquito. For example, the mite can be a dust mite or a scabies mite. In one embodiment of third aspect, the composition is applied to an exterior surface of an animal. For example, the exterior surface is fur, hair, skin, hide, or scalp.

In another embodiment of the third aspect, the composition is applied to a hard surface. For example, the hard surface is untreated lumber, treated lumber, a wood beam, a wood board, cardboard, particle board, joist, a stud, a baseboard, wood trim, a hardwood floor, a window sill, a screen, a porch floor, a deck, a door, a wall, a ceiling, interior furniture, or exterior furniture.

In a further embodiment of the third aspect, the composition is applied to a soft surface. For example, the soft surface is one or more of a carpet, a curtain, a rug, padded furniture, a cushion, a mattress, a box spring, a mattress cover, a bedbug repellent mattress pad, a bed sheet, a blanket, a pillow, a doll, a stuffed animal, or a net.

In one embodiment of the third aspect, the composition is applied to a bracelet, a necklace, a bandage, or an article of clothing to be worn. For example, the article of clothing is a hat, a glove, pants, a shirt, underwear, a coat, a bandana, a scarf, a sock, a shoe, a shoelace, a footwear liner, a footwear insert, gaiters, hunting clothes, or military clothes.

In another embodiment of the third aspect, the composition is applied to a blanket, netting, or an insect trap.

In a fourth aspect, the invention provides a method of treating an arthropod infestation includes applying an effective amount of a nootkatone composition includes a carrier and at least about 0.5% nootkatone to a surface. The composition includes nootkatone ex valencene.

In one embodiment of the fourth aspect, the carrier is one or more of an aqueous liquid carrier, water, a gel, a powder, a zeolite, a cellulosic material, a microcapsule, an alcohol, a hydrocarbon, a polymer, a wax, a fat, or an oil. In another embodiment of the fourth aspect, the composition is formulated as a spray, a powder, a paint, a stain, a wax, a gel, or a paste.

In a fifth aspect, the invention provides a method of treating an arthropod infestation includes applying an effective amount of a nootkatone composition including a carrier and at least about 0.5% nootkatone to a surface. The composition includes nootkatone ex valencene. The method further includes allowing the composition to remain on the surface for at least about 1 hour and removing the composition from the surface.

In one embodiment of the fifth aspect, the composition is removed by one or more of vacuuming, rinsing, steaming, washing, drying, or scrubbing. In another embodiment of the fifth aspect, the method further includes reapplying the nootkatone-containing composition to the surface. In another embodiment of the fifth aspect, the method further includes agitating the surface to which the composition is being applied to clean the surface at the same time as the composition is being applied and/or facilitate penetration of the composition into the surface. For example, the agitating is accomplished by sweeping, vacuuming, or scrubbing.

In a sixth aspect, the invention provides a method of reducing the transmission of a parasite or disease pathogen spread by a biting arthropod, by application of a composition comprising an effective amount of nootkatone ex valencene to an animal capable of acting as a host or being infected by the parasite or disease pathogen. In one embodiment of the fifth aspect, the nootkatone ex valencene is applied to the exterior surface of the animal capable of acting as a host or being infected by the parasite or disease pathogen. In another embodiment of the fifth aspect, the disease pathogen is an arbovirus that causes or is associated with dengue fever, chikungunya, yellow fever, or Zika virus.

In one embodiment according to any of the preceding aspects or embodiments, the nootkatone is limonene-free. In another embodiment according to any of the preceding aspects or embodiments, the nootkatone is bergapten-free. In a further embodiment according to any of the preceding aspects or embodiments, the nootkatone is valencene-free.

These and other features and advantages of the present invention will be more fully understood from the following detailed description taken together with the accompanying claims. It is noted that the scope of the claims is defined by the recitations therein and not by the specific discussion of features and advantages set forth in the present description.

BRIEF DESCRIPTION OF THE DRAWINGS

The following detailed description of the embodiments of the present invention can be best understood when read in conjunction with the following drawings.

DETAILED DESCRIPTION OF THE INVENTION

All publications, patents and patent applications cited herein are hereby expressly incorporated by reference for all purposes.

Before describing the present invention in detail, a number of terms will be defined. As used herein, the singular forms "a," "an," and "the" include plural referents unless the context clearly dictates otherwise. For example, reference to a "nucleic acid" means one or more nucleic acids.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that can or cannot be utilized in a particular embodiment of the present invention.

For the purposes of describing and defining the present invention, it is noted that the term "substantially" is utilized herein to represent the inherent degree of uncertainty that can be attributed to any quantitative comparison, value, measurement, or other representation. The term "substantially" is also utilized herein to represent the degree by which a quantitative representation can vary from a stated reference without resulting in a change in the basic function of the subject matter at issue.

As used herein, the term "vector" refers to an arthropod carrying an arbovirus.

As used herein, the terms "or" and "and/or" is utilized to describe multiple components in combination or exclusive of one another. For example, "x, y, and/or z" can refer to "x" alone, "y" alone, "z" alone, "x, y, and z," "(x and y) or z," "x or (y and z)," or "x or y or z.".

As used herein, the term "about" refers to ±10% of a given value.

Figure 1:
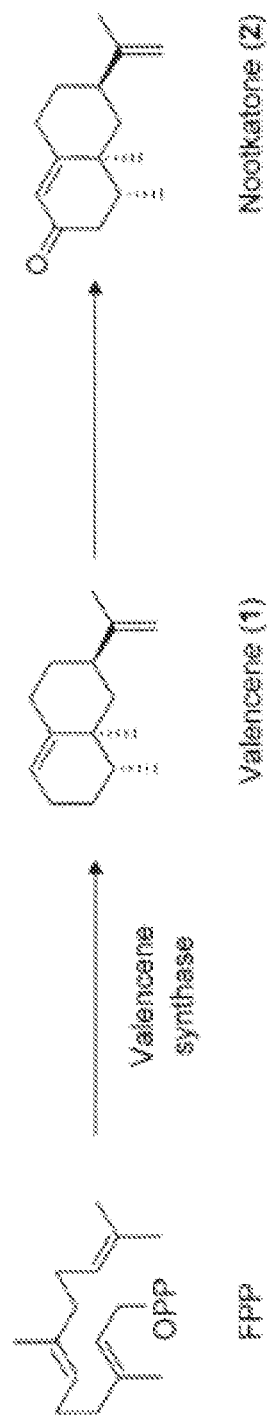
FIG. 1 illustrates a biosynthetic pathway for producing nootkatone.

As used herein, the term "nootkatone" refers to a compound seen in FIG. 1 that may be synthesized, isolated, and purified from of a mixture of products produced in a host modified to express enzymes of the nootkatone biosynthetic pathway or that can be produced from naturally occurring sources, such as citrus plants. "Nootkatone" also refers to a mixture of chemical compounds containing or enriched for the nootkatone compound and derived from a modified host, such as a microorganism, or isolated or derived from plant extracts. "Nootkatone" further refers to derivatives and analogs thereof. For example, the nootkatone compound contemplated for use herein may be produced in vivo through expression of one or more enzymes involved in the nootkatone biosynthetic pathway in a recombinant yeast or in vitro using isolated, purified enzymes involved in the nootkatone biosynthetic pathway, such as those described in U.S. Patent Application Publication Nos. 2015/0007368 and 2012/0246767. Therefore, nootkatone as defined herein can differ chemically from other sources of nootkatone, such as extracts from plants and derivatives thereof, or may include such plant extracts and derivatives thereof.

As used herein, the term "valencene derivative" includes nootkatone and other valencene derived compounds, such as valencene-13-ol.

In one embodiment, nootkatone used herein does not contain bergapten (or bergaptine).

As used herein, the term "nootkatone ex valencene" refers to nootkatone derived from oxidation of valencene that was produced by fermentation, such as by microorganisms harboring one or more valencene synthases and/or other molecules that catalyze formation of valencene. Further, nootkatone ex valencene refers to a combination of chemical compounds derived from oxidation of a valencene-containing fermentation product produced by culturing microorganisms harboring one or more valencene synthases and/or other molecules that catalyze formation of valencene. Nootkatone ex valencene can be purified to maximize the percent of nootkatone relative to other chemical compounds. For example, nootkatone ex valencene can be less than about 50%, about 50%, about 60%, about 70%, about 80%, about 90%, or about 98% nootkatone.

As used herein, the term "active ingredient" refers to a chemical compound or mixture of chemical compounds that kills and/or repels an insect or a pest, such as a tick and related species.

As used herein, the term "individual" refers to a human. Further, the term "subject" refers to an animal, such as a mammal, bird, or reptile.

As used herein, the term "effective amount" refers to an amount of an arthropod-repellent composition that achieves at least 50% repellency for a given arthropod.

As used herein, the terms "therapeutic amount" or "therapeutically effective amount" can be used interchangeably and refer to an amount of a compound that becomes available through the appropriate route of administration to treat or prevent an arthropod from landing on or biting an individual.

As used herein, "biting" refers to contact from an arthropod, such as by mouth parts, that breaks or pierces the skin of an animal and which can cause irritation, itching, pain, and/or swelling at the site of the bite wound. In some instances, biting serves to provide an arthropod with a blood meal, which can serve as sustenance for the arthropod and/or a prerequisite for reproduction, such as egg development. In other instances, biting can be defensive. Non-limiting examples of biting arthropods include cat fleas, bed bugs, termites, fire ants, centipedes, chiggers, drain flies, biting flies, black flies, deer flies, sand flies, horse flies, stable flies, kissing bugs, earwigs, biting gnats, lice, millipedes, mites, and mosquitoes, among others.

Disclosed herein are compositions and methods for preventing vector-borne viral infections and include compositions capable of repelling and killing virus-carrying air-borne pests, such as mosquitoes.

The compositions for killing or repelling virus-carrying air-borne pests and repelling arthropods provided herein can include a carrier and at least about 0.1%, or at least about 0.5%, or at least about 1%, or at least about 2%, or at least about 5%, or at least about 7.5%, or at least about 10%, or greater than about 10%, or greater than about 15%, or greater than about 20%, or greater than about 25%, or greater than about 50% by weight nootkatone or other valencene derivative. In some applications, a nootkatone or other valencene derivative can be present in an amount that is greater than about 60%, about 70%, about 80%, about 90%, about 95% or about 99% by weight of the composition. In one example, the provided compositions contain nootkatone or other valencene derivative in an amount at or about 0.01% to at or about 75% by weight of the composition. In another example, a composition may contain nootkatone or other valencene derivative in an amount of from at or about 1% to at or about 50% by weight of the composition. In another example, a composition may contain nootkatone or other valencene derivative in an amount of from at or about 5% to at or about 40% by weight of the composition. In another example, a composition may contain nootkatone or other valencene derivative in an amount of from at or about 10% to at or about 30% by weight of the composition. In another example, a composition may contain nootkatone or other valencene derivative in an amount of from at or about 15% to at or about 25% by weight of the composition. In another example, a composition may contain nootkatone or other valencene derivative in an amount of from at or about 1% to at or about 90% by weight of the composition. In another example, a composition may contain nootkatone or other valencene derivative in an amount of about 10%, or about 15%, or about 20%, or about 25%, or about 30%, or about 50% by weight of the composition. In another example, a composition may contain nootkatone or other valencene derivative or a combination thereof in an amount of up to 99% by weight of the composition.

In another embodiment, a contemplated formulation can be seen in Table No. 1.

TABLE NO. 1

| Contemplated formulation | |
|---|---|
| Ingredient | Approximate Wt. % |
| nootkatone or other valencene derivative | 0.01-75 |
| Additional active Ingredients | 0-30 |
| Carriers | 25-99.9 |
| Additives | 0-50 |

In certain embodiments, compositions contemplated herein may include nootkatone and one or more additional active ingredients, such as DEET, a pyrethroid, or any other synthetic or natural insecticide or pesticide or repellent. Further examples of additional active ingredients include, for example, those disclosed in U.S. Pat. Nos. 6,897,244, 7,129,271, 7,629,387, and 7,939,091. An additional active ingredient may also be added to a composition in an amount of about 1% to about 30%, or about 5%, or about 10%, or about 15%, or about 20%, or about 25%, or about 30%, or about 50% by weight of the composition.

In another embodiment, compositions contemplated herein may include nootkatone or other valencene derivative in combination with one or more additives, such as a fragrance, a preservative, a propellant, a pH buffering agent, a colorant, a surfactant, an emulsifier, a solvent, a salt, an antibiotic, an analgesic, and the like. An additive may be added to a composition in an amount of greater than about 1% to about 50%, or about 5%, or about 10%, or about 15%, or about 20%, or about 25%, or about 30%, or about 50% by weight of the composition.

In another embodiment, compositions contemplated herein may include nootkatone in combination with one or more synergists that increase one or more of repellency, knockdown, lethality, and/or longevity of effectiveness (residual activity). Examples of synergists include piperonyl butoxide, DMSO, and vanillin.

In another embodiment, compositions may include a carrier, such as an aqueous liquid carrier, water, a gel, a powder, a zeolite, a cellulosic material, a microcapsule, an alcohol such as ethanol, a hydrocarbon, a polymer, a wax, a fat, and/or an oil, and the like. A carrier may be added to a composition in an amount of about 10%, or about 15%, or about 20%, or about 25%, or about 30%, or about 50% by weight of the composition. In some applications, a carrier can be present in an amount that is at or greater than about 60%, about 70%, about 80%, about 90%, about 95%, or about 99% by weight of the composition.

In certain embodiments, a composition may be formulated for application topically on an exterior surface of an individual, for example, to the lips, skin, scalp or hair. For example, the composition may be provided as an aerosol, a solution, an emulsion, an oil, a lotion, a soap, a shampoo, a conditioner, a spray, a gel, a cosmetic, a perfume, or a cologne.

In further embodiments, a composition may be formulated for application onto an exterior surface of an animal, such the fur, hair, skin, hide, and/or scalp of a human, a domesticated animal, livestock, or a pet.

In other embodiments, a composition may be formulated for ingestion by an animal to convey insect or pest repellency through secretion of an active ingredient onto the skin, hair, fur, and the like. For example, the composition may be formulated as animal feed, such as an extruded animal food, a grain, a canned food, an animal treat, a dog bone, and the like. In still further embodiments, a composition may be formulated for ingestion such as may be added to a water reservoir to control mosquito larvae and oral/systemic formulations for small animals that serve as disease reservoirs or companion animals.

Compositions containing nootkatone to treat or prevent arthropod infestations in humans (especially children), farm animals (such as sheep, pigs, horses, cows, camels), or companion animals (such as dogs and cats) can be formulated for ingestion as a food supplement, a drinking water supplement, a paste, gel, or syrup that is eaten, or a liquid drench to be given orally. Contemplated compositions can be made in many different forms including a granular form to be added to food, pill form, chew tablets, and liquid suspensions. In one example, the composition may be formulated as animal feed, such as an extruded animal food, a grain, a canned food, an animal treat, a dog bone, an additive to fish food, a coating on animal forage, and the like.

Compositions containing nootkatone to treat or prevent arthropod infestations can be placed into the form of pharmaceutical dosage forms, such as solid oral forms such as tablets, capsules granules, pellets, or sachet, for example, or liquids such as solutions, suspensions, emulsions, elixirs, or capsules filled with the same, all for oral use, in the form of suppositories for rectal administration, or in the form of sterile injectable solutions for parenteral (including subcutaneous) use. Such pharmaceutical compositions and unit dosage forms thereof can comprise conventional ingredients in conventional proportions, with or without additional active compounds, and such unit dosage forms can contain any suitable effective amount of the active ingredient commensurate with the intended daily dosage range to be employed.

Compositions containing nootkatone to treat or prevent arthropod infestations can also contain one or more inactive pharmaceutical excipients such as diluents, lubricants, solubilizers, alcohols, binders, controlled release polymers, enteric polymers, disintegrants, colorants, flavorants, sweeteners, antioxidants, preservatives, pigments, additives, fillers, suspension agents, surfactants (for example, anionic, cationic, amphoteric and nonionic), and the like. Various FDA-approved inactive ingredients are found at the FDA's "The Inactive Ingredients Database" that contains inactive ingredients specifically intended as such by the manufacturer, whereby inactive ingredients can also be considered active ingredients under certain circumstances, according to the definition of an active ingredient given in 21 CFR 210.3(b)(7).

In other embodiments, a composition may be formulated for application to a hard surface, such as a structural surface, including but not limited to untreated lumber, treated lumber, a wood beam, a wood board, cardboard, particle board, joist, stud and the like, a baseboard, wood trim, a hardwood floor, a window sill, a screen, a porch floor, a deck, a door, a wall, a ceiling, interior furniture, exterior furniture, and the like. Similarly, a composition may be formulated for application to a soft surface, such as a carpet, a curtain, a rug, padded furniture, a cushion, a mattress, a box spring, a mattress cover, a bedbug repellent mattress pad, a bed sheet, a blanket, a pillow, a doll, a stuffed animal, a net, and the like.

In a further example, the composition may be formulated for reconstitution, such that it may be dispensed in a dry state, such as in a powder, grain, or mixture with other materials, such as animal forage, seed, or fertilizer. Once dispensed, the material may be reconstituted when combined with water.

In further embodiments, a composition contemplated herein can be formulated to be sprayed, sprinkled, poured, or brushed onto a surface. In accordance, the composition may be formulated as a spray, a powder, a paint, a stain, a wax, a gel, a paste, or in any other form.

In another embodiment, a composition may be formulated for application to an outdoor area, such as a lawn, a flowerbed, a forest, a field, and the like. For example, the composition can be placed in a bug bomb, or a pressurized canister adapted to dispense the composition a distance of up to about 1 meter, or up to about 5 meters, or up to about 10 meters. In another example, the composition may be formulated for inclusion in a sprayer device to be connected to a water source and thereby dispensed over a large area.

In further embodiments, a composition contemplated herein can be impregnated within a passive insect repellent dispenser and/or charged within a reservoir of an active insect repellent dispenser either of which can be wearable by an individual or placeable in an interior or exterior volume. For example, the composition may be formulated as or applied to a surface of a bracelet, a necklace, a bandage, or an article of clothing to be worn by an individual or an animal, such as a collar, harness, and the like. Examples of clothing contemplated include hats, gloves, pants, shirts, underwear, coats, bandanas, scarves, socks, shoes, shoelaces, footwear liners and inserts, gaiters, hunting clothes, military clothes, and the like. Further, the composition may be formulated as a blanket, a netting, an insect trap, such as or similar to fly paper, a glue trap, a colored trap, and the like.

Further, the composition may be formulated as part of a bandage, which further can include an antibiotic. The bandage may be configured with an adherent portion and a non-stick composition-carrying absorptive portion. Alternatively, the bandage may consist of a porous carrier portion that is adherent.

In another embodiment, a device including an attractant may be used to carry a contemplated composition. For example, the device may include an insect or pest food and/or a pheromone and/or a scent and/or a lure and/or may emit light and/or sound including subsonic emissions, and the like.

In one embodiment, compositions contemplated herein may be applied to one or more surfaces using an applicator having a reservoir for carrying the composition in a wet form or a dry form. Examples of applicators that may be used include an aerosol container with a spray nozzle with or without a spray straw to focus delivery of the composition, a spray gun, an impregnated sheet, film, and/or matrix where the composition is released onto the surface by a releasing agent, such as water or other carrier. Additional examples include a roll-on dispenser, such as is used for liquid deodorant application, a telescopic gel/wax dispenser, similar to a gel deodorant applicator, lip balm dispenser, or a glue stick, a squeeze tube, a pen, such as is used for a bleach pen or an anti-itch composition applicator, a felt-tip marker, a temporary tattoo, a stamp such as a self-inking stamp, a pump sprayer, a trigger sprayer, a pressurized spraying device, a sponge, a squeegee, an airbrush, a brush, a pet brush, a broom, a mop, a roller, a powder dispenser, such as for dispensing foot powder, a hair brush that dispenses composition into the bristles when the brush used on hair, a comb that dispenses composition onto the teeth when the comb is used on hair.

Methods of treating arthropod infestations, as contemplated herein, can include application of a nootkatone-containing composition to a surface. Application can be by any applicator or dispenser disclosed herein and others. Additional methods of treating arthropod infestations can include application of a nootkatone-containing composition to a surface, allowing the composition to remain on the surface for a period of time, and then removing the composition from the surface. The composition can be removed after application by waiting for at least about 1, 5, 10, or 30 seconds, at least about 1, 2, 5, 10, 15, or 30 minutes, at least about 1, 2, 4, 8, 12, or 24 hours, at least about 1, 2, 4, or 6 days, or at least about 1, 2, or 4 weeks. The composition can be removed by vacuuming, rinsing, steaming, washing, drying, scrubbing, and combinations thereof. After the composition has been removed, another application of the nootkatone-containing composition can be reapplied to the surface and either left in place or similarly removed. In some embodiments, the process of application can also include brushing or agitating the surface to which the composition is being applied to clean the surface at the same time as the composition is being applied and/or to facilitate penetration of the composition into the surface. The brushing or agitating can be accomplished by sweeping, vacuuming, or scrubbing. Similarly, in the context of a soft surface, such as a carpet, normal walking on the surface can also facilitate penetration of the composition into the soft surface.

EXAMPLES

The Examples that follow are illustrative of specific embodiments of the invention, and various uses thereof. They are set forth for explanatory purposes only, and are not to be taken as limiting the invention.

Example No. 1. Nootkatone Repels *Aedes aegypti* Mosquitoes

Figure 2:
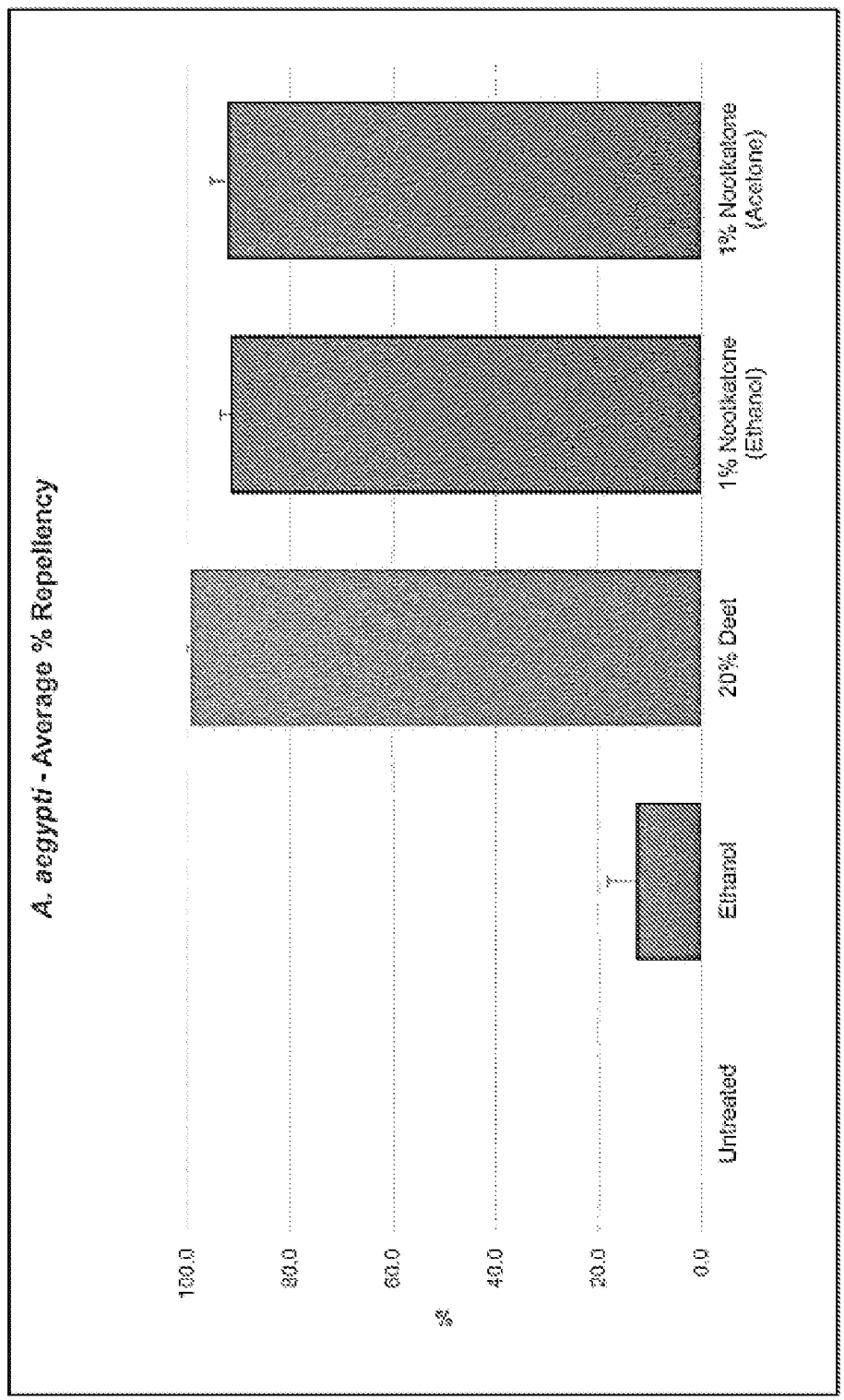
FIG. 2 shows the average repellency of 1% nootkatone compositions against *Ae. aegypti* mosquitoes compared to untreated, ethanol only, and 20% DEET treated mosquitoes. The 1% nootkatone compositions (both ethanol and acetone based) demonstrated repellency similar to that of 20% DEET.

In the following example, the effectiveness of 1% nootkatone compositions in repelling mosquitoes was determined in comparison with DEET in a choice design test.
Methods
Compositions of 1% nootkatone were formulated in either ethanol or acetone and coated onto collagen membrane-covered wells filled with warm blood.
Two hundred and fifty female mosquitoes aged 4-8 days were sucrose deprived for 18 hr and then introduced to the collagen membrane-covered wells. Mosquito probing of the treated collagen membranes was recorded every 2 min during a 20 min period.
Five replicates were performed. A 20% DEET composition was used as a positive control and an ethanol only solution served as a negative control.
Results
As seen in FIG. 2, 1% nootkatone exhibits comparable repellency against *Ae. aegypti* as a 20% DEET formulation.

Example No. 2. Nootkatone Repels *Aedes aegypti*, *Culex quinquefasciatus*, and *Anopheles quadrimaculatus* Mosquitoes A laboratory trial was required to evaluate the repellency of 1% Nootkatone against female *Aedes aegypti, Culex quinquefasciatus*, and *Anopheles quadrimaculatus* mosquitoes using an in vitro method.
Methodology
Test System
Female adult laboratory reared *Aedes aegypti, Culex quinquefasciatus*, and *Anopheles quadrimaculatus* mosquitoes (susceptible) were obtained from Benzon Research in Carlisle, Pa. 250 mosquitoes were used per replicate (5 replicates per test, per species). Adult mosquitoes were 3-8 days old.
Test Treatments and Application
Nootkatone was diluted in ethanol and acetone (note that Nootkatone diluted in acetone was not tested against *An. quadrimaculatus*). A positive control consisting of 20% DEET in ethanol was prepared using stock solutions. Negative controls consisted of no treatment, and ethanol-only treatment.
The treatments were applied directly to prepared collagen membranes by pipetting 25 μL of the appropriate substance onto a membrane and spreading it evenly with the tip of the pipette.

Experimental Design
Exposure container. A 30.5 cm×30.5 cm×30.5 cm rigid plastic frame supported by four, 4 cm high legs, with a sleeved entry on one side and a sliding door on the bottom.
Membrane feeder. Five wells (3 cm in diameter×8 mm in depth) in line on a hollow plastic block (6 cm wide×22 cm long×3 cm deep), which fits through the sliding door in the bottom of the exposure container. Hoses attached to each side of the block circulate heated water that is pumped from a water bath. The sliding door in the bottom of the exposure container covers and uncovers the wells in the membrane feeder, allowing mosquitoes to access the wells.
Test set-up. The membrane feeder was connected to a heated water bath, and warm water passed through the feeder via a circulating pump so that the wells were warmed to 89-95° F. Seventy-two (72) mg of ATP (disodium salt) were added to 26 mL of warmed citrated bovine blood, which was poured into the wells until they were completely full.
The collagen membranes were placed on vacuum greased wax paper for treatment. They were then treated as described above and left for five minutes to dry. After they dried, the membranes were placed over each of the wells (using vacuum grease as an adhesive), completely covering the blood.
Exposure to mosquitoes. The mosquitoes were released into the exposure container just prior to exposure to the membranes. The exposure container was then placed on the membrane feeder and the sliding door opened, allowing the mosquitoes to access the wells. The number of mosquitoes probing each membrane was recorded every two minutes for twenty minutes.
The above procedures were repeated until five replicates were completed. A new batch of 250 female mosquitoes and fresh blood were used for each replicate, and the wells were cleaned in between replicates. The position of the treatments was rotated for each replicate, so that each treatment was tested on each of the five wells.
Statistical Analyses
Percent repellency was calculated for each replicate using the total number of probes with the following formula:

$$\text{Repellency} = \frac{C-T}{C} \times 100$$

where C=the total number of probes on the untreated well and T=the total number of probes on the treated well
Average percent repellency and standard error were then calculated across all five replicates. Shapiro-Wilks tests were conducted to determine the normality of the data, based on total number of probes per replicate. Depending on normality, student t-tests (with concurrent F-tests for variance) or Mann-Whitney tests were then used to determine significance between the treatments.
Results
Results are summarized in Table No. 2 and FIG. 2. Nootkatone diluted in both ethanol and acetone provided significantly higher protection ($\alpha=0.05$) against *Ae. aegypti* and *Cx. quinquefasciatus* than untreated or ethanol alone, and was not significantly different from 20% DEET in its protection level. Against *An. quadrimaculatus*, nootkatone diluted in ethanol provided an average of 90.3% protection; however, this was not found to be significantly different from ethanol alone, which provided an average of 44.9% protection.

TABLE NO. 2

Percent repellency (average ± SE, n = 5) and comparison p-values (α = 0.05) between formulations for female mosquitoes exposed over twenty minutes in an in vitro assay.

| Treatment | Percent repellency | Comparison p-values | | | |
|---|---|---|---|---|---|
| | | Ethanol | 20% DEET | Nootkatone (acetone) | Nootkatone (ethanol) |
| *Aedes aegypti* | | | | | |
| Untreated | — | 0.66 | 0.01 | 0.0002 | <0.0001 |
| Ethanol | 12.6 ± 5.5 | | 0.01 | 0.0005 | 0.0004 |
| 20% DEET | 99.4 ± 0.6 | | | 0.16 | 0.056 |
| Nootkatone (acetone) | 91.5 ± 2.1 | | | | 0.72 |
| Nootkatone (ethanol) | 92.0 ± 3.4 | | | | |
| *Culex quinquefasciatus* | | | | | |
| Untreated | — | 0.333 | 0.01 | 0.005 | 0.011 |
| Ethanol | 29.2 ± 10.0 | | 0.01 | 0.02 | 0.025 |
| 20% DEET | 95.9 ± 4.1 | | | 0.119 | 0.105 |
| Nootkatone (acetone) | 80.1 ± 10.0 | | | | 0.68 |
| Nootkatone (ethanol) | 83.8 ± 5.5 | | | | |
| *Anopheles quadrimaculatus* | | | | | |
| Untreated | — | 0.174 | 0.007 | — | 0.009 |
| Ethanol | 44.9 ± 18.8 | | 0.007 | — | 0.084 |
| 20% DEET | 100.0 ± 0.0 | | | — | 0.007 |
| Nootkatone (ethanol) | 90.3 ± 5.3 | | | | |

Example No. 3. Nootkatone Kills *Aedes aegypti* Mosquitoes

In the following example, the effectiveness of a 1% nootkatone composition in killing *Ae. aegypti* mosquitoes was determined.

Methods

A composition of 1% nootkatone formulated in ethanol was added to filter paper, which was then introduced into a Fluon®-coated container. Ten *Ae. aegypti* mosquitoes were added to the container and observed at 30 min, 1, 4, and 24 hr. Five replicates were performed. Knockdown (KD) occurred when an insect could right itself when placed on its back or initiate directional movement and/or could not fly, but exhibits still movement in the limbs and antennae with or without tactile stimulation. Mortality occurred when the insect exhibited no movement, even with tactile stimulation. An untreated population was observed as a negative control.

Results

Figure 3:
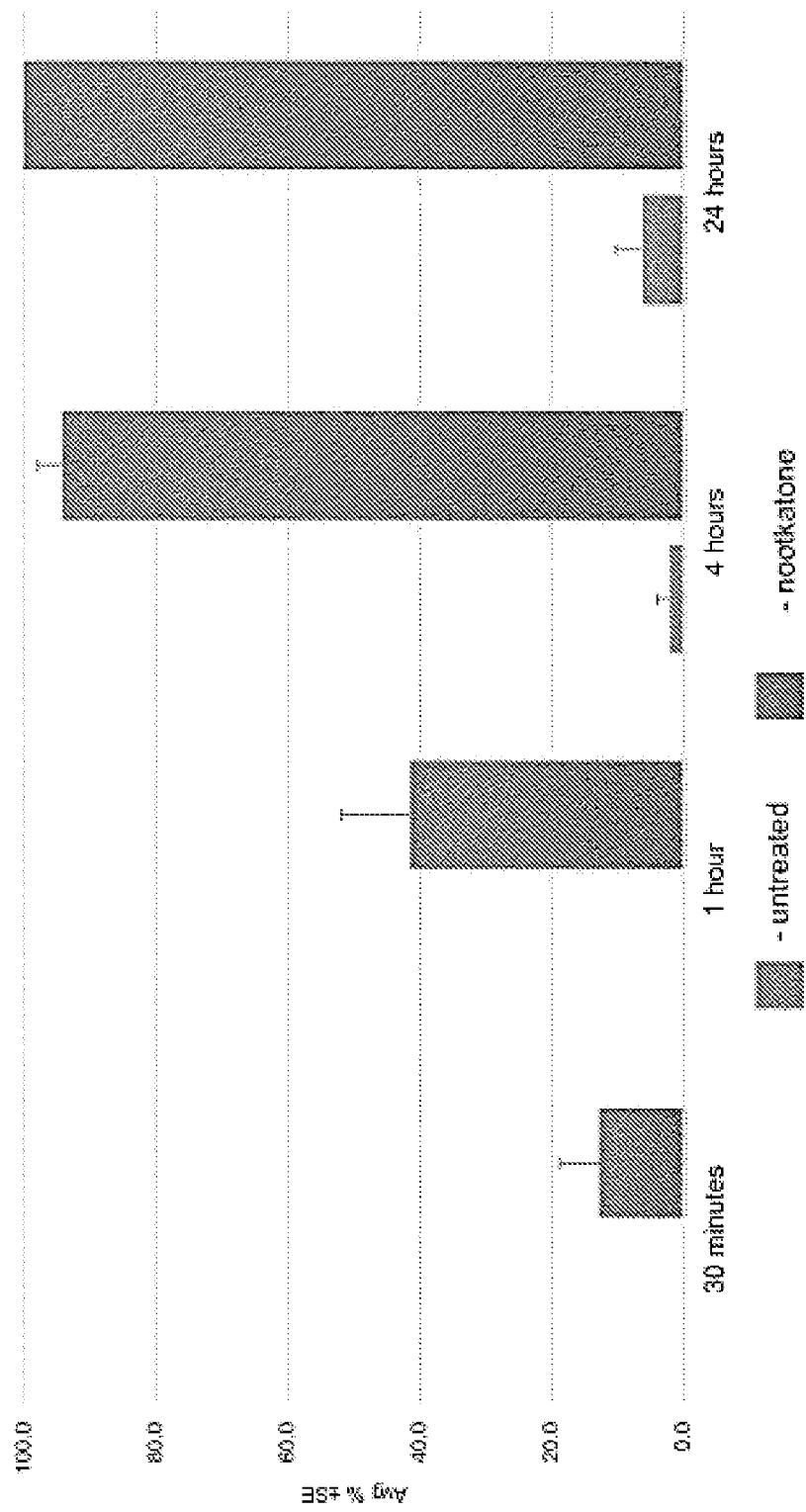
FIG. 3 shows the average percent of *Ae. aegypti* mosquitoes affected upon continuous exposure to 1% nootkatone compositions for 30 min, 1, 4, and 24 hr compared to untreated mosquitoes. By 4 hours, over 90% of the mosquitoes were affected. All mosquitoes were affected after 24 hr.
Figure 4:
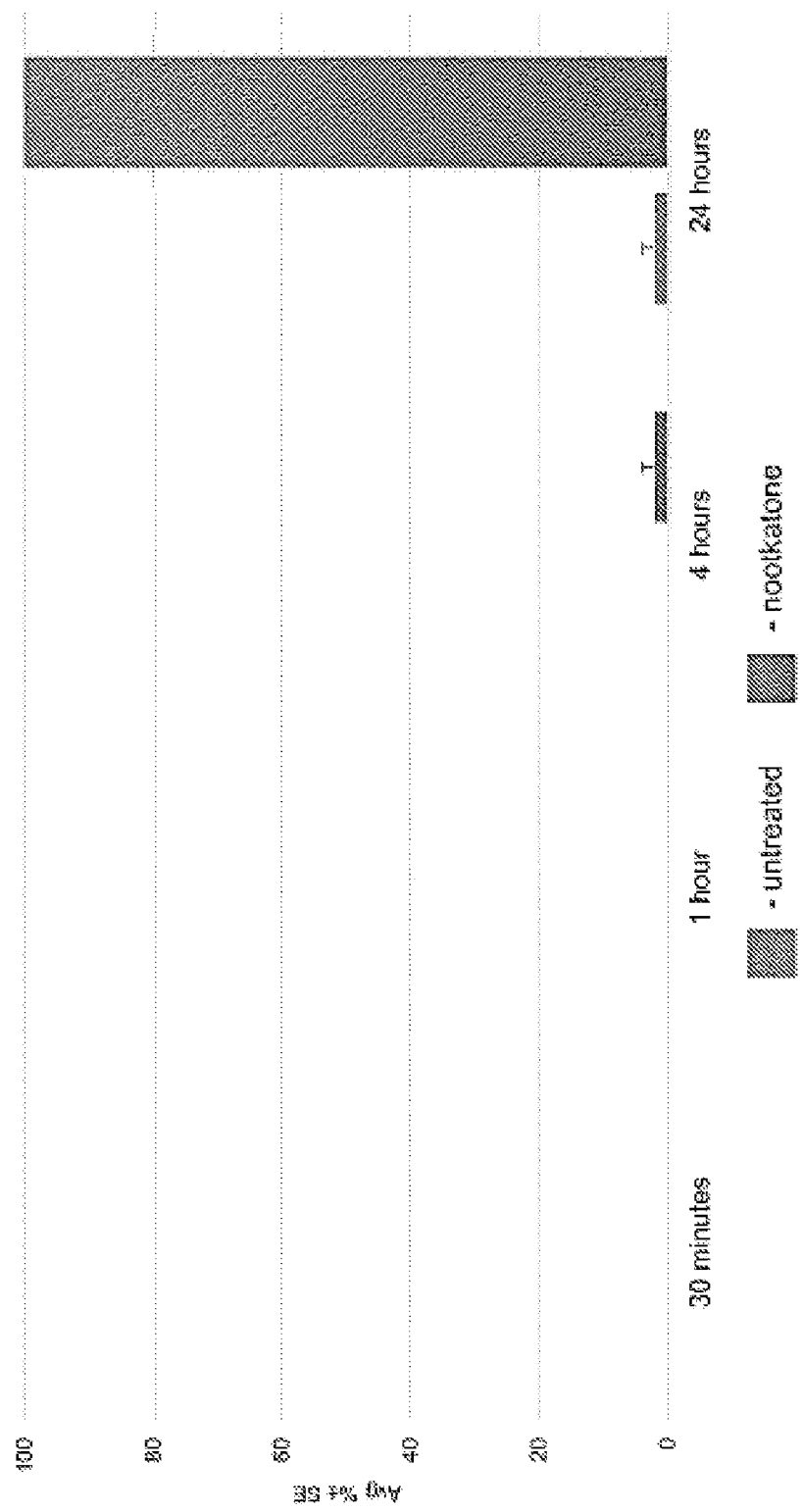
FIG. 4 shows the average percent of *Ae. aegypti* mosquitoes killed upon continuous exposure to 1% nootkatone compositions for 30 min, 1, 4, and 24 hr compared to untreated mosquitoes. Mosquito killing began by 4 hr and was complete by 24 hr.
Figure 5:
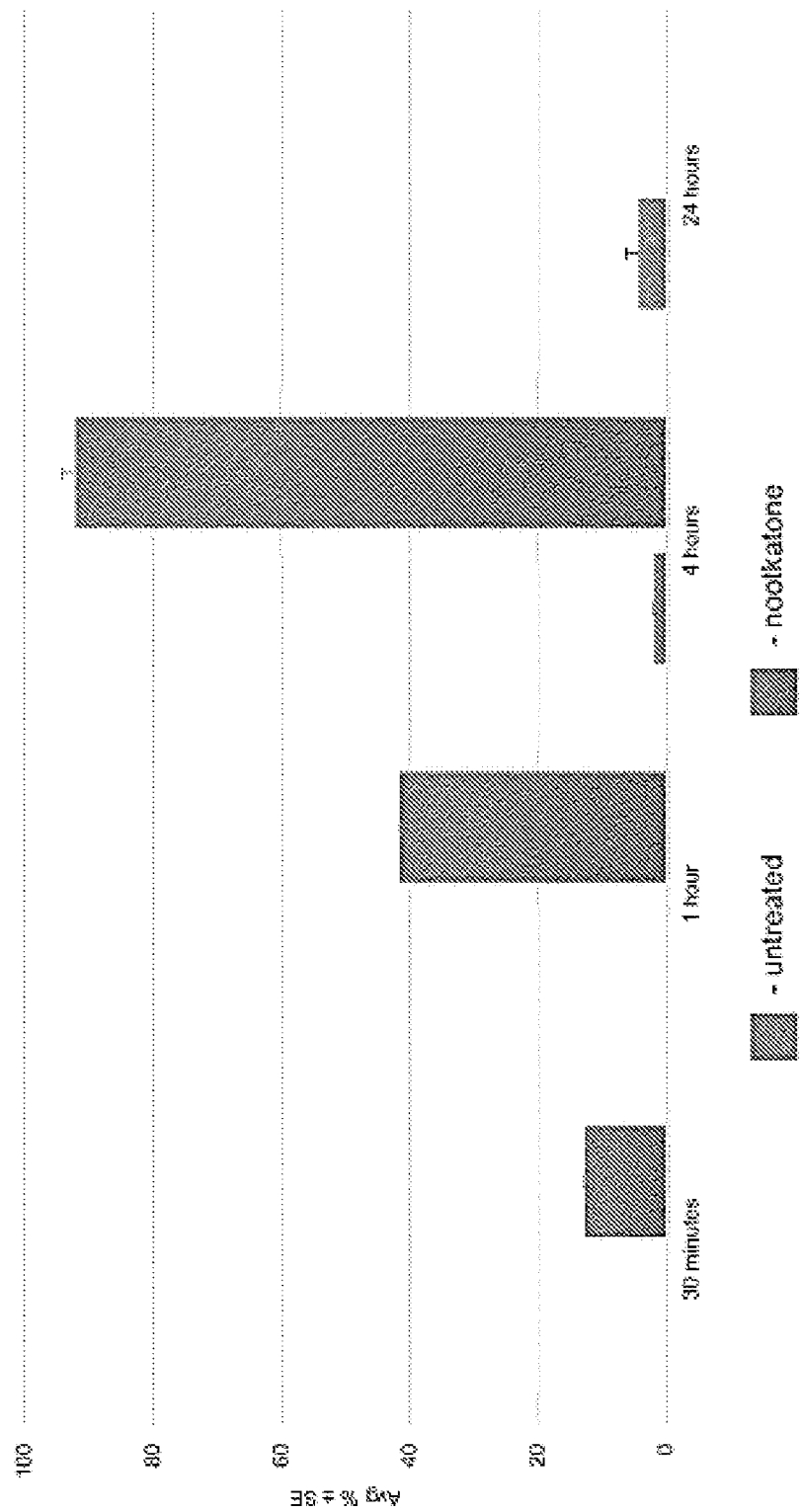
FIG. 5 shows the average percent of *Ae. aegypti* mosquitoes knocked down upon continuous exposure to 1% nootkatone compositions for 30 min, 1, 4, and 24 hr compared to untreated mosquitoes. Mosquito knockdown began by 30 min and was complete before 24 hr.

Compared to the negative control, 1% nootkatone in ethanol begins affecting *Ae. aegypti* mosquitoes after 30 minutes and after 4 hr has affected nearly 100% of the *Ae. aegypti* treatment population (see FIGS. 3-5). Maximal mortality required a 24 hr exposure, however, mortality was first observed after 4 hr of exposure suggesting a rapid increase in the rate of mortality after 4 hr of exposure. Knockdown rate was observed after 30 min exposure and more than doubled after 1 hr and was greater than 90% after 4 hr. Therefore, these results indicate that an environmental dispersed 1% nootkatone formulation begins controlling *Ae. aegypti* mosquitos shortly after exposure. These results suggest that an environmentally dispersed nootkatone formulation would be an effective tool against *Ae. aegypti* mosquito populations.

Example No. 4. Nootkatone Kills a Broad Spectrum of Arthropods

Overview

In the following example, the effectiveness of a 1% nootkatone composition in killing *Ae. aegypti* and other mosquitoes as well as other insects was determined.

A laboratory trial was conducted to assess the efficacy of nootkatone applied to filter paper against aphids (*Schizaphis gramium*), dust mites (*Dermatophagoides* sp.), termites (*Reticulitermes flavipes*), deer ticks (*Ixodes scapularis*), biting midges (*Culicoides* sp.), fire ants (*Solenopsis invicta*), and mosquitoes (*Aedes aegypti* and *Culex*), in terms of knockdown (KD) and mortality. One concentration (1% in ethanol) of nootkatone was assessed for most species, but three concentrations (0.25%, 0.5%, and 1% in ethanol) were assessed for mosquitoes. A negative control group, consisting of filter paper treated with ethanol, was also assessed for comparison purposes for each species.

Test systems were introduced to treated filter paper, allowed to dry, and then introduced into treatment chamber, where treated arthropods were monitored at intervals up to 72 hours. If 100% mortality was obtained prior to 72 hours, the individual study was halted.

Nootkatone at 1% concentration produced 94-100% mortality in mosquitoes, 90% mortality in termites, and 100% mortality in dust mites, deer ticks, fire ants, aphids, and biting midges (respectively) during the experimental duration. The time required for greater than 90% killing varied among species tested, ranging from 30 minutes for aphids, to 24 hours for mosquitoes, fire ants, and biting midges, and 72 hours for termites, deer ticks, and dust mites. At 0.5% concentration, nootkatone in ethanol produced 82-95% mortality in both mosquito species by 72 hours post treatment.

As shown below, it can be concluded that nootkatone has significant efficacy as a pesticide against biting arthropods including mosquitoes, dust mites, termites, deer ticks, fire ants, and biting midges especially at or over the 1% concentration.

Aim

A laboratory trial was required to assess the efficacy of a compound applied to filter paper against dust mites (*Dermatophagoides* sp.), termites (*Reticulitermes flavipes*), deer ticks (*Ixodes scapularis*), biting midges (*Culicoides* sp.), fire ants (*Solenopsis invicta*), and mosquitoes (*Aedes aegypti* and *Culex*), in terms of knockdown (KD) and mortality.

Methods

Fire ants—5 replicates of 10 insects were tested per treatment. A Petri dish lid 3.54 inches (9 cm) in diameter was inverted and serve as the substrate for a 2.75 inch (7 cm) treated filter paper circle. The small Petri dish bottom was inverted over the paper and had its sides treated with Fluon® to prevent climbing and force exposure with the filter paper. The entire Petri dish was enclosed with two rubber bands.

Termites—3 replicates of 10 termites were tested per treatment. One long glass tube with screened ends (to provide ventilation) was used for each test container. Test containers were placed into a larger container to prevent escapes, and were kept in darkness and at high humidity for the duration of the experiment. Filter papers were cut into strips and fitted inside the glass tubes. Two paper strips were pushed end to end to form one continuous strip, leaving a 2 mm gap running the entire length of the tube for viewing termite activity.

Deer Ticks and Dust mites—5 replicates of 10 ticks or 35 dust mites were tested per treatment. Envelopes made from treated 2.5 inch (6.35 cm) filter paper squares served as the containers. After the ticks or dust mites were placed inside the envelopes, and the openings were sealed using small binder clips.

Midges and mosquitoes—5 replicates of 10 insects per treatment were tested. Inverted 10 ounce (295 ml) clear plastic cups with a 0.5 inch (1.27 cm) hole burned into the center of the bottom, and with the sides coated with Fluon® was used at the treatment containers. The bottoms of the containers consisted of Petri dish lids 3.54 inches (9.0 cm) in diameter lined with a treated filter paper circle the same diameter. The cup was placed over the filter paper in the lid and both were secured in place using 2 rubber bands. The insects were introduced through the hole in the cup, and a plastic disc was placed over the opening to prevent escapes.

Arthropods were observed at +30 minutes, and +1, +4, +24, +48, and +72 hours post introduction to the test containers. At each observation period, arthropods were scored according to the following criteria: Knockdown (KD)—cannot right itself when placed on its back or otherwise initiate directional movement and/or cannot fly (if applicable), but still exhibits movement in the limbs and antennae with or without tactile stimulation; and Dead (mortality)—exhibits no movement, even with tactile stimulation. Readings were discontinued if treated mortality reaches 1100%, or control mortality exceeds 20%.

Results

Mosquitoes:

Assessment results are summarized in Table Nos. 3-4 below.

Nootkatone at 0.5, and 1% concentration produced 92%, mortality in, Aedine mosquitoes, and the same concentrations produced 82% and 100% mortality in Culicine mosquitoes during the experimental duration. At 1% concentration, the formulation affected (knockdown+mortality) at least 80% of mosquitoes in both species by 8 hours post treatment. Nootkatone produced less than 80% mortality in mosquitoes at 0.25%, the lowest tested concentration.

Nootkatone has efficacy as a pesticide against yellow fever mosquitoes and southern house mosquitoes, especially at or over the 0.5% concentration.

TABLE NO. 3

Yellow Fever mosquito (*Aedes aegypti*)

| Time post introduction | Means | | | Standard Error | | |
|---|---|---|---|---|---|---|
| | KD | Dead | Affected | KD | Dead | Affected |
| Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 8 hours | 0.0 | 0.0 | 0.0 | 0.0 | 0.0 | 0.0 |
| 24 hours | 0.0 | 0.0 | 0.0 | 0.0 | 0.0 | 0.0 |
| 48 hours | 2.0 | 0.0 | 2.0 | 2.0 | 0.0 | 2.0 |
| 72 hours | 0.0 | 4.0 | 4.0 | 0.0 | 2.4 | 2.4 |
| Nootkatone 0.25% | | | | | | |
| 30 minutes | 0.0 | 17.8 | 17.8 | 0.0 | 17.8 | 17.8 |
| 1 hour | 0.0 | 20.0 | 20.0 | 0.0 | 20.0 | 20.0 |
| 4 hours | 0.0 | 20.0 | 20.0 | 0.0 | 20.0 | 20.0 |
| 8 hours | 2.2 | 15.6 | 17.8 | 2.2 | 15.6 | 17.8 |
| 24 hours | 4.4 | 13.3 | 17.8 | 4.4 | 13.3 | 17.8 |
| 48 hours | 2.0 | 15.6 | 17.6 | 2.0 | 15.6 | 15.2 |
| 72 hours | 8.4 | 17.6 | 26.0 | 4.1 | 15.2 | 18.6 |
| Nootkatone 0.5% | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 5.3 | 0.0 | 5.3 | 3.6 | 0.0 | 3.6 |

TABLE NO. 3-continued

Yellow Fever mosquito (*Aedes aegypti*)

| Time post introduction | Means | | | Standard Error | | |
|---|---|---|---|---|---|---|
| | KD | Dead | Affected | KD | Dead | Affected |
| 8 hours | 29.9 | 0.0 | 29.9 | 11.9 | 0.0 | 11.9 |
| 24 hours | 60.6 | 22.5 | 83.1 | 9.7 | 13.4 | 8.8 |
| 48 hours | 15.1 | 72.0 | 87.1 | 6.9 | 7.8 | 6.8 |
| 72 hours | 7.5 | 92.5 | 100.0 | 3.4 | 3.4 | 3.2 |
| Nootkatone 1% | | | | | | |
| 30 minutes | 0.0 | 0.0 | 0.0 | 0.0 | 0.0 | 0.0 |
| 1 hour | 1.8 | 0.0 | 1.8 | 1.8 | 0.0 | 1.8 |
| 4 hours | 46.9 | 0.0 | 46.9 | 17.6 | 0.0 | 17.6 |
| 8 hours | 80.4 | 0.0 | 80.4 | 15.5 | 0.0 | 15.5 |
| 24 hours | 18.5 | 65.5 | 84.0 | 6.9 | 15.3 | 16.0 |
| 48 hours | 9.6 | 80.4 | 90.0 | 6.2 | 15.5 | 10.0 |
| 72 hours | 2.0 | 92.0 | 94.0 | 2.0 | 8.0 | 6.0 |

TABLE NO. 4

Southern house mosquito (*Culex*)

| Time post introduction | Means | | | Standard Error | | |
|---|---|---|---|---|---|---|
| | KD | Dead | Affected | KD | Dead | Affected |
| Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 8 hours | 0.0 | 0.0 | 0.0 | 0.0 | 0.0 | 0.0 |
| 24 hours | 4.0 | 0.0 | 4.0 | 2.4 | 0.0 | 2.4 |
| 48 hours | 34.7 | 0.0 | 34.7 | 5.0 | 0.0 | 5.0 |
| 72 hours | 4.2 | 36.7 | 40.9 | 2.6 | 4.9 | 5.5 |
| Nootkatone 0.25% | | | | | | |
| 30 minutes | 24.0 | 0.0 | 24.0 | 16.9 | 0.0 | 16.9 |
| 1 hour | 22.0 | 0.0 | 22.0 | 17.4 | 0.0 | 17.4 |
| 4 hours | 32.2 | 0.0 | 32.2 | 15.5 | 0.0 | 15.5 |
| 8 hours | 18.0 | 0.0 | 18.0 | 13.6 | 0.0 | 13.6 |
| 24 hours | 14.0 | 12.2 | 26.2 | 9.8 | 3.7 | 12.0 |
| 48 hours | 14.2 | 61.3 | 75.6 | 2.4 | 9.6 | 9.2 |
| 72 hours | 2.0 | 74.0 | 76.0 | 2.0 | 12.1 | 10.8 |
| Nootkatone 0.5% | | | | | | |
| 30 minutes | 0.0 | 0.0 | 0.0 | 0.0 | 0.0 | 0.0 |
| 1 hour | 2.5 | 0.0 | 2.5 | 2.5 | 0.0 | 2.5 |
| 4 hours | 4.0 | 0.0 | 4.0 | 2.4 | 0.0 | 2.4 |
| 8 hours | 4.0 | 0.0 | 4.0 | 2.4 | 0.0 | 2.4 |
| 24 hours | 18.5 | 10.5 | 29.0 | 6.5 | 3.2 | 5.6 |
| 48 hours | 23.0 | 49.0 | 72.0 | 8.6 | 15.0 | 9.7 |
| 72 hours | 0.0 | 82.0 | 82.0 | 0.0 | 6.6 | 6.6 |
| Nootkatone 1% | | | | | | |
| 30 minutes | 2.2 | 0.0 | 2.2 | 2.2 | 0.0 | 2.2 |
| 1 hour | 52.2 | 0.0 | 52.2 | 5.9 | 0.0 | 5.9 |
| 4 hours | 83.7 | 0.0 | 83.7 | 2.8 | 0.0 | 2.8 |
| 8 hours | 78.9 | 13.1 | 92.0 | 8.6 | 8.4 | 2.0 |
| 24 hours | 2.2 | 97.8 | 100.0 | 2.2 | 2.2 | 0.0 |
| 48 hours | 0.0 | 100.0 | 100.0 | 0.0 | 0.0 | 0.0 |
| 72 hours | 0.0 | 100.0 | 100.0 | 0.0 | 0.0 | 0.0 |

Other Arthropods:

Assessment results are summarized in Table Nos. 5-10 below.

Nootkatone at 1% concentration produced 100%, mortality in dust mites, 90% mortality in termites, and 98% mortality in deer ticks after 72 hours. The same 1% concentration of nootkatone produced 100% mortality in fire ants and biting midges after only 24 hours.

It can be concluded that nootkatone has significant efficacy as a pesticide against dust mites, termites, deer ticks, fire ants, and biting midges.

TABLE NO. 5

Efficacy of Nootkatone against Dust mites

| Time post introduction | Means | | | Standard Error | | |
|---|---|---|---|---|---|---|
| | KD | Dead | Affected | KD | Dead | Affected |
| Dust mite Untreated | | | | | | |
| 72 hours | 0.0 | 0.0 | 0.0 | 0.0 | 0.0 | 0.0 |
| Nootkatone | | | | | | |
| 72 hours | 0.0 | 100.0 | 100.0 | 0.0 | 0.0 | 0.0 |

TABLE NO. 6

Efficacy of Nootkatone against Termites

| Time post introduction | Means | | | Standard Error | | |
|---|---|---|---|---|---|---|
| | KD | Dead | Affected | KD | Dead | Affected |
| Termite Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 0.0 | 0.0 | 0.0 | 0.0 | 0.0 | 0.0 |
| 48 hours | 3.3 | 0.0 | 3.3 | 3.3 | 0.0 | 3.3 |
| 72 hours | 0.0 | 0.0 | 0.0 | 0.0 | 0.0 | 0.0 |
| Nootkatone | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 83.3 | 0.0 | 83.3 | 16.7 | 0.0 | 16.7 |
| 48 hours | 0.0 | 86.7 | 86.7 | 0.0 | 13.3 | 13.3 |
| 72 hours | 0.0 | 90.0 | 90.0 | 0.0 | 10.0 | 10.0 |

TABLE NO. 7

Efficacy of Nootkatone against Fire Ants

| Time post introduction | Means | | | Standard Error | | |
|---|---|---|---|---|---|---|
| | KD | Dead | Affected | KD | Dead | Affected |
| Fire ant Untreated | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 0.0 | 0.0 | 0.0 | 0.0 | 0.0 | 0.0 |
| 24 hours | 0.0 | 10.0 | 10.0 | 0.0 | 10.0 | 10.0 |
| Nootkatone | | | | | | |
| 30 minutes | 0.0 | 0.0 | 0.0 | 0.0 | 0.0 | 0.0 |
| 1 hour | 0.0 | 0.0 | 0.0 | 0.0 | 0.0 | 0.0 |
| 4 hours | 22.0 | 0.0 | 22.0 | 19.6 | 0.0 | 19.6 |
| 24 hours | 0.0 | 100.0 | 100.0 | 0.0 | 0.0 | 0.0 |

TABLE NO. 8

Efficacy of Nootkatone against Deer Ticks

| Time post introduction | Means | | | Standard Error | | |
|---|---|---|---|---|---|---|
| | KD | Dead | Affected | KD | Dead | Affected |
| Deer tick Untreated | | | | | | |
| 24 hours | 0.0 | 2.0 | 2.0 | 0.0 | 2.0 | 2.0 |
| 48 hours | 0.0 | 4.0 | 4.0 | 0.0 | 2.4 | 2.4 |
| 72 hours | 0.0 | 6.0 | 6.0 | 0.0 | 4.0 | 4.0 |
| Nootkatone | | | | | | |
| 24 hours | 62.0 | 36.0 | 100.0 | 18.5 | 18.1 | 0.0 |
| 48 hours | 16.0 | 82.0 | 100.0 | 5.1 | 5.8 | 0.0 |
| 72 hours | 0.0 | 98.0 | 100.0 | 0.0 | 2.0 | 0.0 |

TABLE NO. 9

Efficacy of Nootkatone against Biting Midges

| Time post introduction | Means | | | Standard Error | | |
|---|---|---|---|---|---|---|
| | KD | Dead | Affected | KD | Dead | Affected |
| Biting midge Untreated | | | | | | |
| 30 minutes | 0.0 | 2.5 | 2.5 | 0.0 | 2.5 | 2.5 |
| 1 hour | 2.2 | 2.5 | 4.7 | 2.2 | 2.5 | 2.9 |
| 4 hours | 0.0 | 4.7 | 4.7 | 0.0 | 2.9 | 2.9 |
| 24 hours | 2.2 | 4.7 | 6.9 | 2.2 | 2.9 | 4.5 |
| Nootkatone | | | | | | |
| 30 minutes | 100.0 | 0.0 | 100.0 | 0.0 | 0.0 | 0.0 |
| 1 hour | 98.2 | 1.8 | 100.0 | 1.8 | 1.8 | 0.0 |
| 4 hours | 21.3 | 78.7 | 100.0 | 1.9 | 1.9 | 0.0 |
| 24 hours | 0.0 | 100.0 | 100.0 | 0.0 | 0.0 | 0.0 |

TABLE NO. 10

Efficacy of Nootkatone against Aphids

| Time post introduction | Means | | | Standard Error | | |
|---|---|---|---|---|---|---|
| | KD | Dead | Affected | KD | Dead | Affected |
| Aphid Untreated | | | | | | |
| 30 minutes | 1.8 | 3.5 | 5.3 | 1.8 | 2.1 | 3.6 |
| Nootkatone | | | | | | |
| 30 minutes | 6.0 | 94.0 | 100.0 | 6.0 | 6.0 | 0.0 |

Figure 6:
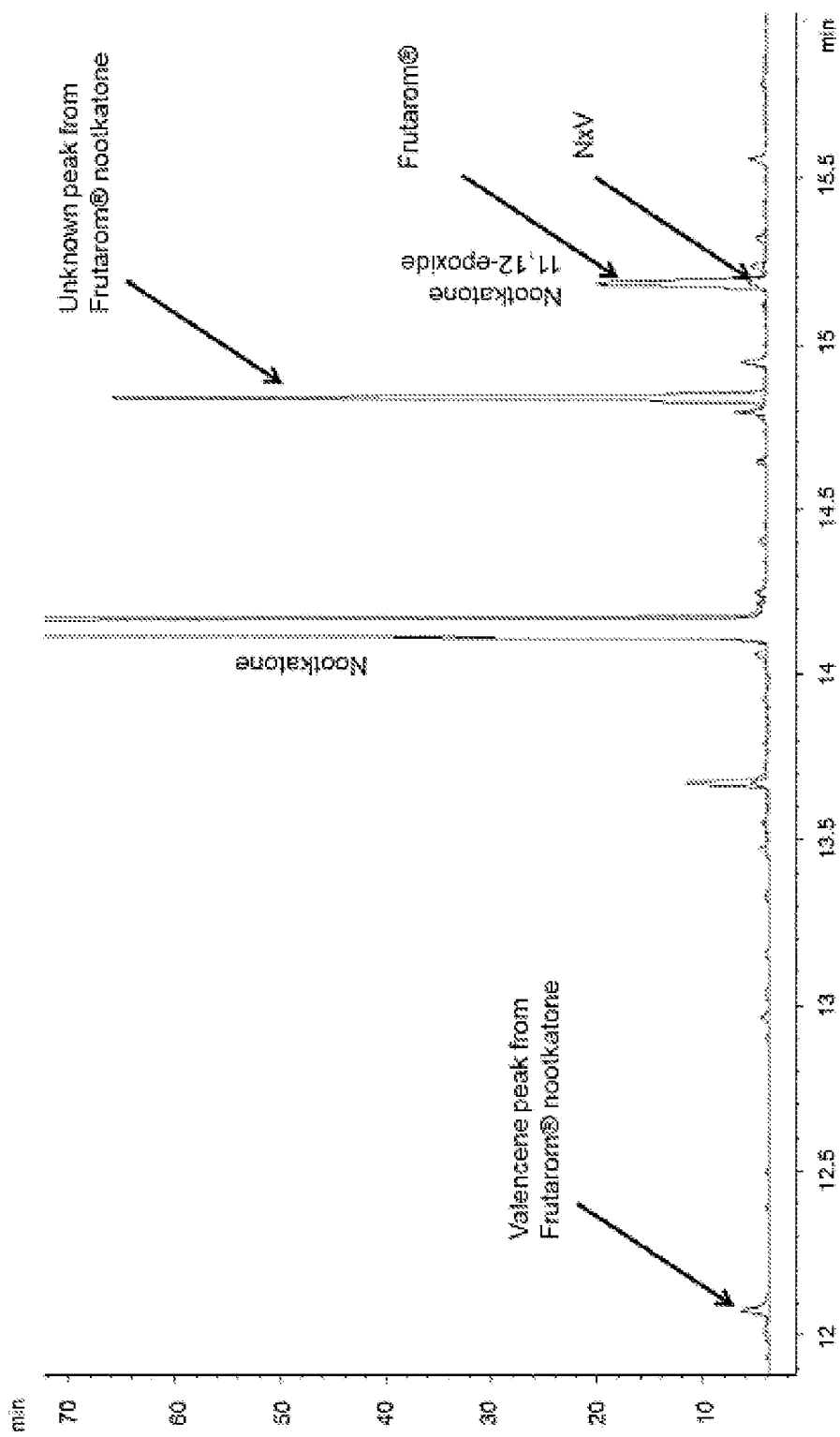
FIG. 6 is GC-FID chromatogram overlay of Frutarom® nootkatone (i.e., citrus-derived nootkatone) and the nootkatone (NxV) used for the arthropod studies described herein (see Examples below).
Figure 7:
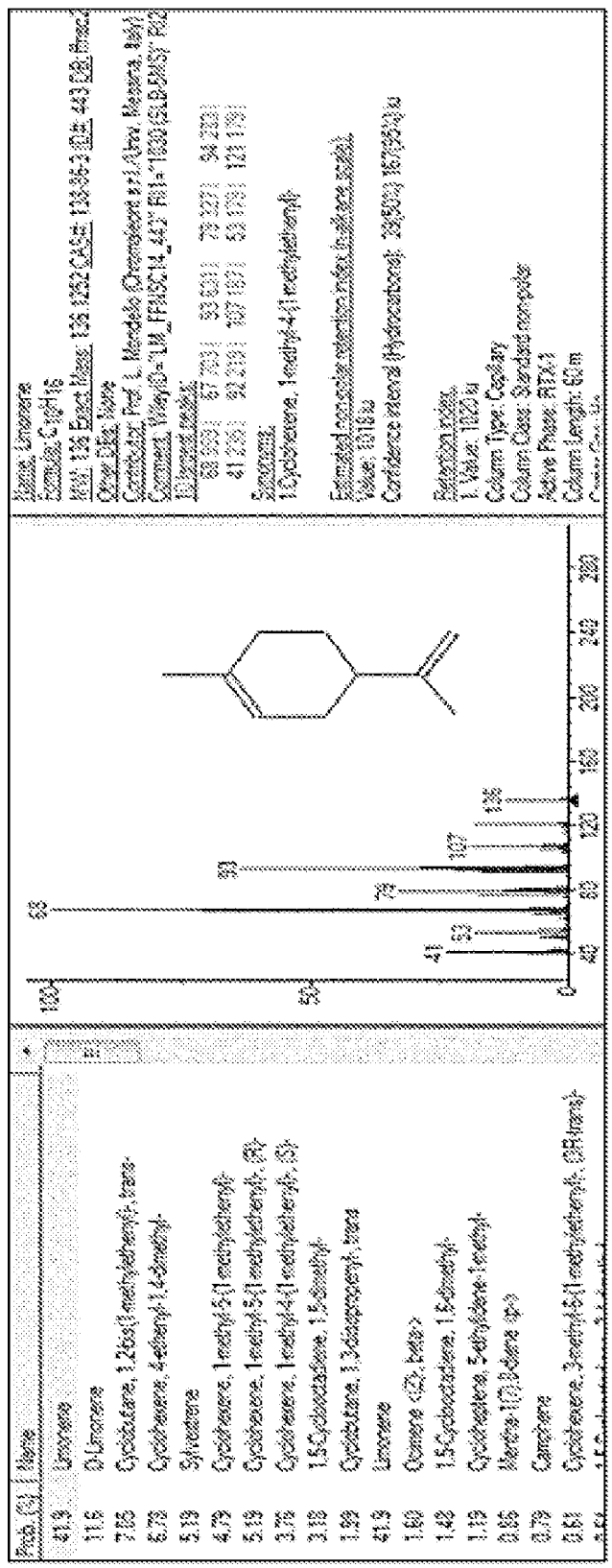
FIG. 7 is a GC-MS NIST library match of an unknown peak in Frutarom® nootkatone. The peak was identified as limonene. No limonene nor bergapten was found in the nootkatone used in the present application.

Example No. 5: Comparison of Fermentation-Derived Nootkatone with Citrus-Derived Nootkatone Overview Nootkatone, as defined herein, has a particular chemical profile indicative of its constituent chemical species. Other sources of nootkatone can have different chemical profiles and therefore actually represent different chemical compositions. GC-FID analyses of the nootkatone used in the studies described above (obtained from oxidation of fermentation-derived valencene, also known as, nootkatone ex valencene (NxV)) and a citrus fruit-derived nootkatone (also known as nootkatone ex citrus, which is derived from citrus fruit and available from Frutarom®, Corona, Calif.) are shown in FIG. 6. The nootkatone used in the studies described herein lacked valencene and demonstrated a lower amount of 11,12-epoxide than the Frutarom® nootkatone. Moreover, further analysis of an unknown peak from the Frutarom® nootkatone sample revealed that the Frutarom® sample contained limonene (see FIG. 7), whereas the nootkatone used in the present studies was limonene-free. These results underscore the different chemical profile of the nootkatone used herein (NxV) compared to commercially-available nootkatone derived from citrus, such as that provided by Frutarom®.

These results are also in accord with the observation (not shown) that nootkatone obtained from fermentation-derived valencene does not contain bergapten (or bergaptine). Bergapten (5-methoxypsoralen or 5-MOP) is a compound found in bergamot and citrus essential oils that causes phototoxicity in humans. (see Gionfriddo et al. "Elimination of Furocoumarins in Bergamot Peel Oil," *Perfumer & Flavorist.*, 2004; 29:48-52; Ferreira Maia et al. "Plant-based insect repellents: a review of their efficacy, development and testing," Malaria Journal, 2011; 10:Suppl1-11; and Kejlová et al. "Phototoxicity of bergamot oil assessed by in vitro techniques in combination with human patch tests." Toxicol In Vitro. 2007; 21:1298-1303). In addition, GHS health warning statements for bergapten indicate that it can cause allergic skin reactions, allergy or asthma symptoms, or breathing difficulties if inhaled, and can cause genetic defects or cancer in animals. For such reasons, a Cosmetic Ingredient Review expert panel in assessing the safety of 14 citrus-derived peel oil ingredients concluded no more than 0.0015% (15 ppm) bergapten should be included in cosmetic products (see "Safety Assessment of Citrus-Derived Peel Oils as Used in Cosmetics," Cosmetic Ingredient Review Expert Panel Final Report, Sep. 30, 2014: 1-31).

Bergapten is present in naturally derived valencene (from citrus) and carries over through the chemical oxidation that forms nootkatone. Bergapten can be photo-activated to become a skin irritant, which can be worse around an open bite wound. Bergapten-associated adverse skin reactions around arthropod bites could mask or give false positives for the preliminary signs of an infection. Therefore, nootkatone ex valencene, which is bergapten-free, has particular safety advantages over plant-derived nootkatone and is preferable for topical application.

Example No. 6: Evaluation of the Repellency of a Compound Against Fleas, Ticks, Bed Bugs, and Termites Aim An in vitro laboratory trial was required to assess the repelling action of nootkatone applied to filter paper against cat fleas (*Ctenocephalides felis*), deer ticks (*Ixodes scapularis*), bed bugs (*Cimex lectularius*), and termites (*Reticulitermes flavipes*) in a choice test design.

Methodology

Test System

The following test systems were obtained from the listed sources for this trial:

| Species | Common name | Life stage/sex | Source |
|---|---|---|---|
| Ctenocephalides felis | Cat flea | Adult/mixed sex | El Labs, Soquel, CA |
| Ixodes scapularis | Deer tick | Adult/mixed sex | OSU Tick Lab, Stillwater, OK |
| Cimex lectularius | Bed bug | Adult/mixed sex | Schal Lab, NCSU, Raleigh, NC |
| Reticulitermes flavipes | Eastern subterranean termite | Adult workers/mixed sex | Field sites in Maryland |

Test Treatments and Application

The sponsor provided a sample of nootkatone (98%), which was diluted in ethanol to a 0.5% concentration. The treatment was applied to filter paper at a rate of 1 mL for a 9 cm filter paper disc, and a rate of 1.9 mL for a 15 cm filter paper disc. A negative control group, consisting of untreated filter paper, was also assessed for comparison purposes.

Experimental Design

The filter paper was cut to fit the design of a suitable test container for each species as follows:

Bed bugs: Petri dishes (9 cm) were modified by cutting a circular hole in the bottom of a clean petri plate. Fine mesh nylon cloth was fastened to the bottom using adhesive, covering the hole. The petri plate was then inverted, with the screened bottom serving as the top. Treated and untreated filter papers were cut in half and fitted into the new bottom of the test containers. Treated replicates received one half treated and one half untreated filter paper; negative control replicates received only untreated filter paper.

Cat fleas: Treated and untreated filter papers were cut in half and fitted into the bottom of a 15 cm clear plastic cylinder. Treated replicates received one half treated and one half untreated filter paper; negative control replicates received only untreated filter paper.

Deer ticks: Treated and untreated filter papers were cut in half and fitted into the bottom of a 9 cm petri dish. Treated replicates received one half treated and one half untreated filter paper; negative control replicates received untreated filter paper only. The petri dish arenas were then placed on their sides, with the control halves positioned at the lower half and the treated half at the upper half.

Termites: One long glass tube with screened ends (to provide ventilation) was used for each test container. Test containers were placed into a larger container to prevent escapes, and were kept in darkness and at high humidity for the duration of the experiment. Treated and untreated filter papers were cut into strips and fitted inside the glass tubes. Treated replicates received one treated and one untreated paper; negative control replicates received two untreated strips. The two paper strips were pushed end to end to form one continuous strip, leaving a 2 mm gap running the entire length of the tube for viewing termite activity.

Arthropod Introduction and Assessments

Bed bugs: Bed bugs were placed in the center of each test container and covered with the fine-mesh lid. The containers were kept in darkness at ambient laboratory conditions for 24 hours. At the end of the exposure period, the distribution (on or under each filter paper) of bed bugs was recorded.

Cat fleas: Cat fleas were introduced to the untreated side of each arena, and their distribution (on or under each paper) was recorded at +1, +4, and +24 hours post-introduction.

Deer ticks: Ticks were introduced, one at a time, to the bottom half of the control (untreated) arena, and monitored to see how long it took them to get to the upper "treated" side of the arena. Ticks were allowed up to three minutes to cross into the upper area of each arena. Any ticks not crossing into the designated treated area (and therefore exhibiting appropriate questing behavior) were discarded. Once a tick had crossed into the upper side of the control arena, it was gently picked up with forceps and placed in the bottom half of the treated arena, and the procedure repeated. Ticks were considered "not repelled" if they crossed onto the treated side of the treated arena within three minutes.

Termites: Termites were placed in the center of each test container and left to distribute undisturbed for 24 hours. At the end of the exposure period, the distribution (on or under each filter paper) of termites was recorded.

Data Analysis

Fleas, Bed Bugs, and Termites

The number of insects in each location was converted to a percentage, for which the average and standard error were calculated across all five replicates.

Percent repellency was calculated with the following formula:

% repellency=$(1-((t/T)/(c/C)))*100$

Where t=number of insects on treated side of treated arena
T=total number of insects in treated arena
c=average number of insects on right side of untreated arenas
C=average total number of insects in untreated arenas Ticks The number of repelled ticks for each replicate was added together, and the average and standard error were calculated across all five replicates. The numbers were divided by the total number of ticks per replicate to obtain the percent repellency.

Results

Assessment results are summarized in Table No. 11 below. See Appendix I for full raw data.

TABLE NO. 11

| Calculated percent repellency (average ± SE) for several species exposed to nootkatone. ||
| --- | --- |
| Cat flea | 61.9 ± 15.0 |
| Bed bug | 93.9 ± 6.1 |
| Termite | 100.0 ± 0.0 |
| Deer tick | 96.0 ± 2.4 |

It can be concluded that in this laboratory trial, 0.5% nootkatone in ethanol was highly repellent to bed bugs, termites, and deer ticks, and showed some potential repellency against cat fleas.

APPENDIX I

Raw Data Tables

Species Cat fleas (*Ctenocephalides felis*)
Treatment: Untreated control

| Time post introduction | Replicate 1 | | Replicate 2 | | Replicate 3 | | Replicate 4 | | Replicate 5 | |
| --- | --- | --- | --- | --- | --- | --- | --- | --- | --- | --- |
| | Total: 13 Control Left | Control Right | Total: 10 Control Left | Control Right | Total: 11 Control Left | Control Right | Total: 9 Control Left | Control Right | Total: 10 Control Left | Control Right |
| 1 Hour | 5 | 8 | 4 | 6 | 7 | 4 | 2 | 7 | 4 | 6 |
| 4 Hours | 6 | 7 | 4 | 6 | 6 | 5 | 2 | 7 | 5 | 5 |
| 24 Hours | 7 | 6 | 7 | 3 | 6 | 5 | 4 | 5 | 6 | 4 |

Treatment: Nootkatone

| Time post introduction | Replicate 1 | | Replicate 2 | | Replicate 3 | | Replicate 4 | | Replicate 5 | |
| --- | --- | --- | --- | --- | --- | --- | --- | --- | --- | --- |
| | Total: 10 Untreated | Treated | Total: 10 Untreated | Treated | Total: 10 Untreated | Treated | Total: 7 Untreated | Treated | Total: 8 Untreated | Treated |
| 1 Hour | 2 | 8 | 4 | 6 | 7 | 3 | 3 | 4 | 4 | 3 |
| 4 Hours | 9 | 1 | 7 | 3 | 6 | 4 | 4 | 3 | 6 | 2 |
| 24 Hours | 8 | 2 | 6 | 4 | 9 | 1 | 6 | 1 | 8 | 0 |

Species Bed bugs (*Cimex lectularius*)
Treatment: Untreated control

| Time post introduction | Replicate 1 | | Replicate 2 | | Replicate 3 | | Replicate 4 | | Replicate 5 | |
| --- | --- | --- | --- | --- | --- | --- | --- | --- | --- | --- |
| | Total: 13 Control Left | Control Right | Total: 10 Control Left | Control Right | Total: 11 Control Left | Control Right | Total: 9 Control Left | Control Right | Total: 10 Control Left | Control Right |
| 24 Hours | 9 | 1 | 9 | 1 | 8 | 2 | 0 | 10 | 7 | 3 |

Treatment: Nootkatone

| Time post introduction | Replicate 1 | | Replicate 2 | | Replicate 3 | | Replicate 4 | | Replicate 5 | |
| --- | --- | --- | --- | --- | --- | --- | --- | --- | --- | --- |
| | Total: 10 Untreated | Treated | Total: 10 Untreated | Treated | Total: 10 Untreated | Treated | Total: 7 Untreated | Treated | Total: 8 Untreated | Treated |
| 24 Hours | 10 | 0 | 10 | 0 | 9 | 1 | 10 | 0 | 10 | 0 |

APPENDIX I-continued

Raw Data Tables

Species: Eastern subterranean termite (*Reticulitermes flavipes*)
Treatment: Untreated control

| Time post introduction | Replicate 1 | | Replicate 2 | | Replicate 3 | |
|---|---|---|---|---|---|---|
| | Total: 10 Control Left | Control Right | Total: 10 Control Left | Control Right | Total: 10 Control Left | Control Right |
| 24 Hours | 10 | 0 | 9 | 1 | 4 | 6 |

Treatment: Nootkatone

| Time post introduction | Replicate 1 | | Replicate 2 | | Replicate 3 | |
|---|---|---|---|---|---|---|
| | Total: 10 Untreated | Treated | Total: 10 Untreated | Treated | Total: 10 Untreated | Treated |
| 24 Hours | 10 | 0 | 10 | 0 | 10 | 0 |

Raw Data Deer tick (*Ixodes scapularis*)
Treatment: Untreated

| Replicate 1 | | Replicate 2 | | Replicate 3 | | Replicate 4 | | Replicate 5 | |
|---|---|---|---|---|---|---|---|---|---|
| Total: 10 Repelled | Not repelled | Total: 10 Repelled | Not repelled | Total: 10 Repelled | Not repelled | Total: 10 Repelled | Not repelled | Total: 10 Repelled | Not repelled |
| 0 | 10 | 0 | 10 | 0 | 10 | 0 | 10 | 0 | 10 |

Treatment: Nootkatone

| Replicate 1 | | Replicate 2 | | Replicate 3 | | Replicate 4 | | Replicate 5 | |
|---|---|---|---|---|---|---|---|---|---|
| Total: 10 Repelled | Not repelled | Total: 10 Repelled | Not repelled | Total: 10 Repelled | Not repelled | Total: 10 Repelled | Not repelled | Total: 10 Repelled | Not repelled |
| 9 | 1 | 10 | 0 | 9 | 1 | 10 | 0 | 10 | 0 |

Example No 7 Production of Nootkatone Ex Valencene

Nootkatone ex valencene may be produced in vivo through expression of one or more enzymes involved in the nootkatone biosynthetic pathway in a recombinant yeast or in vitro using isolated, purified enzymes involved in the nootkatone biosynthetic pathway, such as those described in U.S. Patent Application Publication Nos. 2015/0007368 and 2012/0246767. The final conversion of valencene to nootkatone may be done enzymatically in vivo or in vitro, or may be performed by chemical oxidation (typically inorganic) in vitro.

Briefly, the valencene synthase gene (CVS) from *Citrus sinensis* cv. Valencia (Valencia orange) was cloned from RNA isolated from the juice vesicles of freshly harvested Valencia orange using the procedure previously described in Example 1 of U.S. Pat. No. 7,442,785.

First, Yep-GW-URA (Takahashi et al., (2007) Biotechnol Bioeng. 97(1):170-181) was generated by inserting a gateway cloning cassette (RfB) with the form attR1-Cm$^R$-ccdB gene-attR2 (Hartley et al., (2000) Genome Res. 10:1788-1795) into the SmaI restriction site of YEp352-URA (Bio-Technical Resources), which contains an URA3 selectable marker, an ADH1 promoter and an ADH1 terminator flanking, two BamHI sites (one 5' to the ADH1 promoter and the other 3' to the ADH terminator), a 2-micron or, an ampicillin resistance gene and a colE1 origin of replication. The resulting vector was designated YEp-CVS-URA.

The CVS gene (set forth in SEQ ID NO: 1, and encoding amino acid sequence is set forth in SEQ ID NO: 2) was then amplified from RNA isolated from the juice vesicles of freshly harvested Valencia orange to contain restriction sites for subcloning into the yeast shuttle expression vector Yep-GW-URA. Following digestion of Yep-GW-URA with EcoRI and XbaI, the amplified product was cloned into the yeast shuttle expression vector YEp-GW-URA.

The YEp-CVS-ura vector was maintained in *S. cerevisiae* by selecting on SD minimal medium lacking uracil at 28° C. The vector also was maintained in *Escherichia coli* by selecting for resistance to ampicillin on LB medium containing 100 .mu.g/mL ampicillin.

To screen for production of valencene, the *Saccharomyces cerevisiae* yeast cell strains CALI5-1 (ura3, leu2, his3, trp1, Aerg9::HIS3, HMG2cat/TRP1::rDNA, dpp1, sue), ALX7-95 (ura3, his3, trp1, Aerg9::HIS3, HMG2cat/TRP1::rDNA, dpp1, sue) or ALX11-30 (ura3, trp1, erg9def25, HMG2cat/TRP1::rDNA, dpp1, sue) were used.

The CALI5-1 strain (see U.S. published Appl. No. US20040249219; U.S. Pat. Nos. 6,531,303 and 6,689,593) has a Δleu2 deletion, which required the introduction of leucine into its media. ALX7-95 was derived from CALI5-1 by correcting the Δleu2 deficiency of CALI5-1 with a functional LEU2 gene (see U.S. published Appl. No. US2010/0151519).

ALX11-30 was constructed from CALI51 in several steps from ALX7-175.1 as described in US2010/0151519. Briefly, ALX7-95 HPS was obtained by transforming a plasmid containing the *Hyoscyamus muticus* premnaspirodiene synthase (HPS) into ALX7-95 strain. The YEp-HPS plasmid was obtained by cloning the gene for HPS into Yep-GW-URA to give YEp-HPS-ura (YEp-HPS). Then, an error prone PCR reaction of the ERG9 gene was performed, and the resulting DNA was transformed into ALX7-95 harboring YEpHPS. Transformants were plated on YP medium lacking ergosterol and screened for premnaspirodiene production. Those that produced high levels of premnaspirodiene were saved. One strain, ALX7-168.25 [ura3, trp1, his3, erg9$^{def}$25, HMG2cat/TRP1::rDNA, dpp1, sue, YEpHPS] was transformed with a PCR fragment of the complete HIS3 gene to create a functional HIS3 gene. Transformants were isolated that were able to grow in the absence of histidine in the medium. From this transformation, ALX7-175.1 was isolated [ura3, trp1, erg9def25. HMG2cat/TRP1::rDNA, dpp1, sue YEpHPS]. Finally, the plasmid YEpHPS was removed by growing ALX7-175.1 several generations in YPD (10 g/L yeast extract, 20 g/L peptone, 20 g/L glucose) and plating cells on YPD plates. Colonies were identified that were unable to grow on SD medium without uracil (0.67 Bacto yeast nitrogen base without amino acids, 2% glucose, 0.14% yeast synthetic drop-out medium without uracil). This strain was designated ALX11-30.

For screening for production of valencene by valencene synthase or mutants, the YEp-CVS-ura plasmid, containing the CVS gene or modified versions of the CVS gene, was transformed into the above yeast strains using the lithium acetate yeast transformation kit (Sigma-Adrich). The ALX7-95 and ALX11-30 strains generally produced more valencene than the CALI5-1 strain. CALI5-1 was used for initial screening in vials (as described in Example 3) and production n fermenters. Subsequently, ALX7-95 or ALX11-30 were used for screening in vials and fermenters. Typically, ALX7-95 was used for screening in vials and ALX11-30 was used for fermenters.

Transformants were selected on SDE-ura medium (0.67% Bacto yeast nitrogen base without amino acids, 2% glucose, 0.14% yeast synthetic drop-out medium supplement without uracil, and 40 mg/L ergosterol as needed). Colonies were picked and screened for valencene production using the microculture assay described below.

Production of valencene was performed in a 3-L fermentation tank (New Brunswick Bioflow 110). One liter of fermentation medium was prepared and autoclaved in the fermentation tank (20 g $(NH_4)_2SO_4$, 20 g $KH_2PO_4$, 1 g NaCl, $MgSO_4$ $7H_2O$, 4 g Solulys corn steep solids (Roquette)). The following components were then added: 20 ml mineral solution (0.028% $FeSO_4$ $7H_2O$, 0.029% $ZnSO_4$ $7H_2O$, 0.008% $CuSO_4$ $5H_2O$, 0.024% $Na_2MoO_4$ $2H_2O$, 0.024% $COC_2$ $6H_2O$, 0.017% $MnSO_4$ $H_2O$, 1 mL HCl); 10 mL 50% glucose; 30 mL vitamin solution (0001% biotin; 0.012% calcium pantothenate, 0.06% inositol, 0.012% pyridoxine-HCl, 0.012% thiamine-HC); 10 mL 10% $CaCl_2$, and 20 mL autoclaved soybean oil (purchased from local groceries). For sterol requiring strains, including CALI5-1 and ALX7-95, 50 mg/L cholesterol or 40 mg/L ergosterol was included in the medium.

The seed culture for inoculating the fermentation on medium was prepared by inoculating 50 mL of SDE-ura-trp medium (see Example 3C.2.) with CALI5-1, ALX7-95 or ALX11-30 containing the YEp-CVS-ura plasmid. This culture was grown at 28° C. until early stationary phase (248 hr). One mL of this culture was inoculated into 500 mL of SDE-ura-trp medium and grown for 24 hr at 28° C. A 50-mL aliquot (5% inoculum) was used to inoculate the medium in the fermentation tank.

The fermentor was maintained at 28° C. The air flow was 1 vvm and the $dO_2$ was maintained above 30% by adjusting the agitation. The pH was maintained at 4.5 using phosphoric acid and NaOH or $NH_4OH$.

When the glucose concentration fell below 1 g/L, a feeding regimen was initiated such that the glucose in the fermentor was kept between 0 and 1 g/L. The glucose feed consisted of 60% glucose (w/v).

At the end of the fermentation, generally about 132 hours after inoculation, sodium sulfate was added to 10-15% final concentration as was an additional 50 mL soybean oil and the contents of the fermentor were agitated for one hour. After allowing the fermentation vessel contents to settle, the oil was recovered by centrifugation and the valencene content n the oil was determined.

To assay valencene, 3 mL of suspension was placed in a vial to which 3 mL of acetone containing 20 mg/L cedrene was added. After vortexing, the mixture was extracted with 6 mL hexane containing 10 mg/L hexadecane followed by additional vortexing. The organic phase was transferred to a second vial for analysis by gas chromatography using cedrene and hexadecane as internal standards for extraction efficiency and injection respectively. The CALI5-1, ALX7-95 or ALX11-30 *S. cerevisiae* containing Yep-CVS-ura, and expressing valencene synthase, was found to produce valencene.

The valencene-containing soybean oil, produced by fermentation as described above, was concentrated and purified using wiped-film distillation at 100° C. and 350 mTorr to generate an oil that contained approximately 68% valencene by weight. This material was converted to nootkatone by two different methods described below.

A. Oxidation of Valencene to Nootkatone Using Chromium Trioxide

The valencene distillate produced as described above was oxidized to nootkatone using chromium trioxide and pyridine in dichloromethane as follows. Chromium trioxide (369 g, 3.69 mol, 22 eq) was added in portions to a solution of pyridine (584 g, 7.4 mol, 44 eq) in 5 L of dichloromethane. The mixture was stirred for 10 minutes, 50 grams of valencene distillate (68% w/w, 0.167 mol, 1 eq) was added over four minutes, and the mixture was stirred at 22° C., for 18 hours. The liquor was drained from the vessel, and the solids were washed twice with 2 L of methyl tertbutyl ether (MTBE). The combined organic layers were further diluted with 2 L of MTBE and successively washed three times with 1.25 L of 5% sodium hydroxide, twice with 2 L of 5% hydrochloric acid, and once with 2 L of brine. The organic phase was dried over 200 grams of anhydrous sodium sulfate, filtered, and concentrated by evaporation to give 36.8 grams crude nootkatone (48% w/w, 0.081 mol, 48% yield).

B. Oxidation of Valencene to Nootkatone Using Silica Phosphonate-Immobilized Chromium (III) Catalyst Silica phosphonate chromium (III) resin (48.9 g, PhosphonicS, Ltd.) was placed in a 5 L round bottom flask equipped with a condenser, thermowell, overhead stirrer, and sparge tube. Two (2) L of t-butano and valencene distillate (68%, 500 g, 1.67 moles, 1 eq) were added, the contents were heated to 45° C., and the heterogeneous suspension was allowed to stir as oxygen was sparged through the solution (ca 1.5 L/min) and nitrogen flushed over the head-space. 70% t-butyl hydroperoxide in water (TBHP, 315 g, 2.45 moles, 1.47 eq) was added to the solution over 2 hrs while the temperature of the reaction was heated and maintained at 60±5° C. The reaction was allowed to stir until >90% of the valencene allows consumed, as determined by gas chromatography. The reaction was then allowed to cool to room temperature and the silica catalyst removed by filtration. The flask and resin were washed with 500 mL isopropanol. One (1) L of deionized water was added to the combined organic solution (t-butanol and isopropanol), and the mixture was concentrated under reduced pressure by evaporation to afford an amber colored oil. The oil was dissolved in 3 L of toluene and washed with 3.125 L of 15% sulfuric acid for 15 minutes with vigorous agitation. The aqueous layer was removed and re-extracted with 1 L of toluene. The combined toluene layers were then washed three times with 2.5 L of 1 M sodium hydroxide, twice with 500 mL saturated sodium chloride, and dried over anhydrous magnesium sulfate. After filtration, the solvent was removed under reduced pressure by evaporation to afford 378 g of viscous amber oil (33% nootkatone by weight, 0.57 moles, 34% yield).

(Citrus valencene synthase)

SEQ ID NO: 1 atgtcgtctggagaaacatttcgtcctactgcagatttccatcctagtttatggagaaaccatttcctca
aggtgcttctgatttcaagacagttgatcatactgcaactcaagaacgacacgaggcactgaaagaaga
ggtaaggagaatgataacagatgctgaagataagcctgttcagaagttacgcttgattgatgaagtacaa
cgcctgggggtggcttatcactttgagaaagaaatagaagatgcaatacaaaaattatgtccaatctata
ttgacagtaatagagctgatctccacaccgtttcccttcattttcgattgcttaggcagcaaggaatcaa
gatttcatgtgatgtgtttgagaagttcaaagatgatgagggtagattcaagtcatcgttgataaacgat
gttcaagggatgttaagtttgtacgaggcagcatacatggcagttcgcggagaacatatattagatgaag
ccattgctttcactaccactcacctgaagtcattggtagctcaggatcatgtaaccctaagcttgcgga
acagataaatcatgctttataccgtcctcttcgtaaaaccctaccaagattagaggcgaggtattttatg
tccatgatcaattcaacaagtgatcatttatacaataaaactctgctgaattttgcaaagttagatttta
acatattgctagagctgcacaaggaggaactcaatgaattaacaaagtggtggaaagatttagacttcac
tacaaaactacctatgcaagagacagattagtggagttatattttgggatttagggacatacttcgag
cctcaatatgcatttgggagaaagataatgacccaattaaattacatattatccatcatagatgatactt
atgatgcgtatggtacacttgaagaactcagcctctttactgaagcagttcaaagatggaatattgaggc
cgtagatatgcttccagaatacatgaaattgatttacaggacactcttagatgcttttaatgaaattgag
gaagatatggccaagcaaggaagatcacactgcgtacgttatgcaaaagaggagaatcaaaaagtaattg
gagcatactctgttcaagccaaatggttcagtgaaggttacgttccaacaattgaggagtatatgcctat
tgcactaacaagttgtgcttacacattcgtcataacaaattccttccttggcatgggtgattttgcaact
aaagaggttttgaatggatctccaataaccctaaggttgtaaaagcagcatcagttatctgcagactca
tggatgacatgcaaggtcatgagtttgagcagaagagaggacatgttgcgtcagctattgaatgttacac
gaagcagcatggtgtctctaaggaagaggcaattaaatgtttgaagaagaagttgcaaatgcatggaaa
gatattaacgaggagttgatgatgaagccaaccgtcgttgcccgaccactgctcgggacgattcttaatc
ttgctcgtgcaattgattttatttacaaagaggacgacggctatacgcattcttacctaattaaagatca
aattgcttctgtgctaggagaccacgttccattttga (Citrus valencene synthase)

SEQ ID NO: 2

MSSGETFRPTADFHPSLWRNHFLKGASDFKTVDHTATQERHEALKEEVRRMITDAEDKPVQKLRLIDEVQ
RLGVAYHFEKEIEDAIQKLCPIYIDSNRADLHTVSLHERLLRQQGIKISCDVFEKEKDDEGREKSSLIND
VQGMLSLYEAAYMAVRGEHILDEATAFTTTHLKSLVAQDHVTPKLAEQINHALYRPLRKTLPRLEARYFM
SMINSTSDHLYNKILLNFAKLDFNILLELHKEELNELTKWWKDLDETTKLPYARDRLVELYFWDLGTYFE
PQYAFGRKIMTQLNYILSIIDDTYDAYGTLEELSLFTEAVQRWNIEAVDMLPEYMKLIYRTLLDAFNEIE
EDMAKQGRSHCVRYAKEENQKVIGAYSVQAKWFSEGYVPTIEEYMPIALTSCAYTFVITNSFLGMGDFAT
KEVFEWISNNPKVVKAASVICRLMDDMQGHEFEQKRGHVASAIECYTKQHGVSKEEAIKNIFEEEVANAWK
DINEELMMKPTVVARPLLGTILNLARAIDFIYKEDDGYTHSYLIKDQIASVLGDHVPF

Having described the invention in detail and by reference to specific embodiments thereof, it will be apparent that modifications and variations are possible without departing from the scope of the invention defined in the appended claims. More specifically, although some aspects of the present invention are identified herein as particularly advantageous, it is contemplated that the present invention is not necessarily limited to these particular aspects of the invention. Percentages disclosed herein may otherwise vary in amount by ±10, 20, or 30% from values disclosed herein.

What is claimed is:

1. A method of repelling a biting arthropod, comprising: applying an effective amount of a nootkatone-containing composition to a surface, wherein the nootkatone is nootkatone ex valencene, wherein the nootkatone ex valencene is limonene-free and bergapten-free, and wherein the nootkatone-containing composition has a reduced risk for causing one or more of (i) allergic skin reactions, (ii) allergy or asthma symptoms, (iii) breathing difficulties if inhaled, (iv) genetic defects or cancer in animals, and (v) skin irritation, compared to a nootkatone composition containing nootkatone that is neither limonene— nor bergapten-free.

2. The method of claim 1, wherein the nootkatone-containing composition is applied to one or more of fur, hair, skin, hide, or scalp of an animal.

3. The method of claim 1, wherein the nootkatone-containing composition is applied to one or more of untreated lumber, treated lumber, a wood beam, a wood board, cardboard, particle board, a joist, a stud, a baseboard, wood trim, a hardwood floor, a window sill, a screen, a porch floor, a deck, a door, a wall, a ceiling, interior furniture, or exterior furniture.

4. The method of claim 1, wherein the nootkatone-containing composition is applied to one or more of a carpet, a curtain, a rug, padded furniture, a cushion, a mattress, a box spring, a mattress cover, a bedbug repellent mattress pad, a bed sheet, a blanket, a pillow, a doll, a stuffed animal, an insect trap, or a net.

5. The method of claim 1, wherein the nootkatone-containing composition is applied to a bracelet, a necklace, a bandage, a hat, a glove, pants, a shirt, underwear, a coat, a bandana, a scarf, a sock, a shoe, a shoelace, a footwear liner, a footwear insert, gaiters, hunting clothes, or military clothes.

6. The method of claim 1, wherein the biting arthropod is one or more of a cat flea, a bed bug, a termite, a fire ant, a centipede, a chigger, a drain fly, a biting fly, a black fly, a deer fly, a sand fly, a horse fly, a stable fly, a kissing bug, an earwig, a biting gnat, a louse, a millipede, a dust mite, a scabies mite, or a mosquito.

7. The method of claim 1, wherein the biting arthropod is a mosquito.

8. The method of claim 7, wherein the nootkatone-containing composition is applied to the skin of a human.

9. The method of claim 1, wherein the nootkatone-containing composition is applied to the skin of a human.

10. A method of treating an arthropod infestation, comprising:
applying an effective amount of a nootkatone-containing composition comprising a carrier and at least about 0.5% nootkatone to a surface,
wherein the nootkatone is nootkatone ex valencene,
wherein the nootkatone ex valencene is limonene-free and bergapten-free,
and wherein the nootkatone-containing composition has a reduced risk for causing one or more of (i) allergic skin reactions, (ii) allergy or asthma symptoms, (iii) breathing difficulties if inhaled, (iv) genetic defects or cancer in animals, and (v) skin irritation, compared to a nootkatone composition containing nootkatone that is neither limonene—nor bergapten-free.

11. The method of claim 10, wherein the carrier is one or more of an aqueous liquid carrier, water, a gel, a powder, a zeolite, a cellulosic material, a microcapsule, an alcohol, a hydrocarbon, a polymer, a wax, a fat, or an oil.

12. The method of claim 11, wherein the nootkatone-containing composition is formulated as a spray, a powder, a paint, a stain, a wax, a gel, or a paste.

13. The method of claim 10 further comprising:
allowing the nootkatone-containing composition to remain on the surface for at least about 1 hour; and
removing the nootkatone-containing composition from the surface.

14. The method of claim 13, wherein the nootkatone-containing composition is removed by one or more of vacuuming, rinsing, steaming, washing, drying, or scrubbing.

15. The method of claim 13 further comprising reapplying the nootkatone-containing composition to the surface.

16. The method of claim 13 further comprising agitating the surface to which the nootkatone-containing composition is being applied to clean the surface at the same time as the composition is being applied and/or facilitate penetration of the composition into the surface.

17. The method of claim 16, wherein the agitating is accomplished by sweeping, vacuuming, or scrubbing.

18. The method of claim 10, wherein the arthropod is a cat flea, a bed bug, a termite, or a deer tick.

19. The method of claim 18, wherein the arthropod is a termite.

20. A method of reducing transmission of a parasite or disease pathogen spread by a biting arthropod, comprising:
applying an effective amount of a nootkatone-containing composition to an animal capable of acting as a host or being infected by the parasite or disease pathogen,
wherein the nootkatone is nootkatone ex valencene,
wherein the nootkatone ex valencene is limonene-free and bergapten-free,
and wherein the nootkatone-containing composition has a reduced risk
for causing one or more of (i) allergic skin reactions, (ii) allergy or asthma symptoms, (iii) breathing difficulties if inhaled, (iv) genetic defects or cancer in animals, and (v) skin irritation, compared to a nootkatone composition containing nootkatone that is neither limonene— nor bergapten-free.

21. The method of claim 20, wherein the nootkatone-containing composition is applied to one or more of fur, hair, skin, hide, or scalp of an animal capable of acting as a host or being infected by the parasite or disease pathogen.

22. The method of claim 20, wherein the disease pathogen is an arbovirus that causes or is associated with dengue fever, chikungunya, yellow fever, or Zika virus infection.

23. The method of claim 20, wherein the biting arthropod is a mosquito.

* * * * *